United States Patent
Maetaki

(10) Patent No.: US 10,539,768 B2
(45) Date of Patent: Jan. 21, 2020

(54) REAR CONVERTER OPTICAL SYSTEM AND IMAGING APPARATUS INCLUDING THE SAME

(71) Applicant: CANON KABUSHIKI KAISHA, Tokyo (JP)

(72) Inventor: Satoshi Maetaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 15/671,699

(22) Filed: Aug. 8, 2017

(65) Prior Publication Data
US 2018/0045930 A1 Feb. 15, 2018

(30) Foreign Application Priority Data
Aug. 10, 2016 (JP) .................. 2016-157492

(51) Int. Cl.
| | | |
|---|---|---|
| *G02B 15/20* | (2006.01) | |
| *G02B 15/173* | (2006.01) | |
| *G02B 15/177* | (2006.01) | |
| *G02B 15/17* | (2006.01) | |

(52) U.S. Cl.
CPC .......... *G02B 15/20* (2013.01); *G02B 15/173* (2013.01); *G02B 15/177* (2013.01); *G02B 15/17* (2013.01)

(58) Field of Classification Search
CPC ...... G02B 15/20; G02B 15/08; G02B 15/173; G02B 15/177; G02B 15/17; G02B 15/10
See application file for complete search history.

(56) References Cited

U.S. PATENT DOCUMENTS

| | | |
|---|---|---|
| 6,400,515 B1 | 6/2002 | Kohno |
| 8,982,476 B2 | 3/2015 | Maetaki |
| 9,557,543 B2 | 1/2017 | Maetaki |
| 9,645,370 B2 | 5/2017 | Maetaki |
| 9,703,112 B2 | 7/2017 | Maetaki |
| 2011/0080647 A1* | 4/2011 | Sugita ............... G02B 15/08 359/675 |

FOREIGN PATENT DOCUMENTS

| | | |
|---|---|---|
| JP | 2000-221393 A | 8/2000 |
| JP | 2012-47869 A | 3/2012 |

* cited by examiner

*Primary Examiner* — Robert E. Tallman
(74) *Attorney, Agent, or Firm* — Carter, DeLuca & Farrell LLP

(57) ABSTRACT

Provided is a rear converter optical system which is detachably mounted on an image side of a main lens system to increase a focal length of the main lens system, in which an effective diameter Φim of an imaging area of the main lens system, an effective diameter Φcr of a lens surface closest to the image side of the rear converter optical system, a lateral magnification βc of the rear converter optical system in the case where the rear converter optical system is mounted on the main lens system, a backfocus skc in the case where the rear converter optical system is mounted on the main lens system are appropriately set.

14 Claims, 13 Drawing Sheets

REAR CONVERTER OPTICAL SYSTEM AND IMAGING APPARATUS INCLUDING THE SAME

BACKGROUND OF THE INVENTION

Field of the Invention

The present invention relates to a rear converter optical system which is detachably mounted on an image side of a main lens system to increase the focal length of the entire system, and is preferably applied to imaging apparatuses such as, for example, a silver halide film camera, a digital still camera, and a video camera.

Description of the Related Art

A rear converter optical system is conventionally known which is mounted on an image side of a main lens system, namely, an imaging optical system, to change the focal length of the entire system.

The imaging area can be easily expanded by using the rear converter optical system. Moreover, the rear converter optical system has an advantage of smaller size than a converter optical system mounted on an object side of the main lens system.

A rear converter lens is conventionally known which is mounted on the image side of a main lens system to increase the focal length of the entire system (Japanese Patent Application Laid-Open No. 2012-47869). Moreover, various imaging apparatuses including imaging elements of different picture sizes are widely used, and use their dedicated imaging optical systems. If an imaging optical system commonly usable in imaging apparatuses with imaging elements of different picture sizes can be provided, there is no need to prepare imaging optical systems dedicated to the different picture sizes and this is very convenient. There is conventionally known an imaging optical system in which a conversion optical system having a negative refractive power is detachably mounted on the image side of the main lens system to cope with imaging elements having different picture sizes (U.S. Pat. No. 6,400,515).

SUMMARY OF THE INVENTION

A rear converter optical system of the present invention is a rear converter optical system which is detachably mounted on an image side of a main lens system to increase a focal length of the main lens system, and the rear converter optical system satisfies conditional expressions of:

$$0.4 < \Phi cr/(\Phi im \times \beta c) < 1.0;\text{ and}$$

$$0.8 < (\Phi cr/2 + 0.35 \times skc)/(\Phi im \times \beta c/2) < 1.5,$$

where $\Phi im$ represents an effective diameter of an imaging area of the main lens system, $\Phi cr$ represents an effective diameter of a lens surface closest to the image side of the rear converter optical system, $\beta c$ represents a lateral magnification of the rear converter optical system in the case where the rear converter optical system is mounted on the main lens system, and $skc$ represents a backfocus in the case where the rear converter optical system is mounted on the main lens system.

Moreover, a rear converter optical system of the present invention is a rear converter optical system which is detachably mounted on an image side of a main lens system to expand an imaging area of the main lens system, and the rear converter optical system satisfies conditional expressions of:

$$0.8 < \Phi cr/Y\max < 2.0;\text{ and}$$

$$0.8 < (\Phi cr/2 + 0.35 \times skc)/Y\max < 1.5,$$

where $2Y\max$ represents an effective diameter of an imaging area in the case where the rear converter optical system is mounted on the main lens system, $\Phi cr$ represents an effective diameter of a lens surface closest to the image side of the rear converter optical system, and $skc$ represents a backfocus in the case where the rear converter optical system is mounted on the main lens system.

Further features of the present invention will become apparent from the following description of exemplary embodiments with reference to the attached drawings.

DESCRIPTION OF THE EMBODIMENTS

A preferred embodiment of the present invention will now be described below in detail in accordance with the accompanying drawings. A rear converter optical system in the present invention is detachably mounted on an image side of a main lens system to increase the focal length of an entire system. Moreover, the rear converter optical system of the present invention is detachably mounted on the image side of the main lens system to expand an imaging area (image circle, picture size) of the main lens system.

Figure 1:
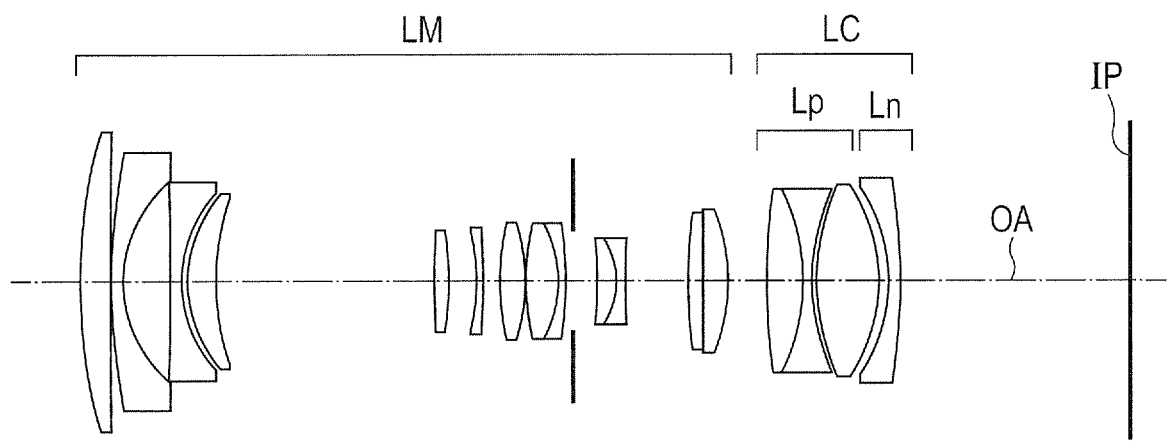
FIG. 1 is a lens cross-sectional diagram in Example in the case where a rear converter optical system is mounted on the main lens system.
Figure 2A:
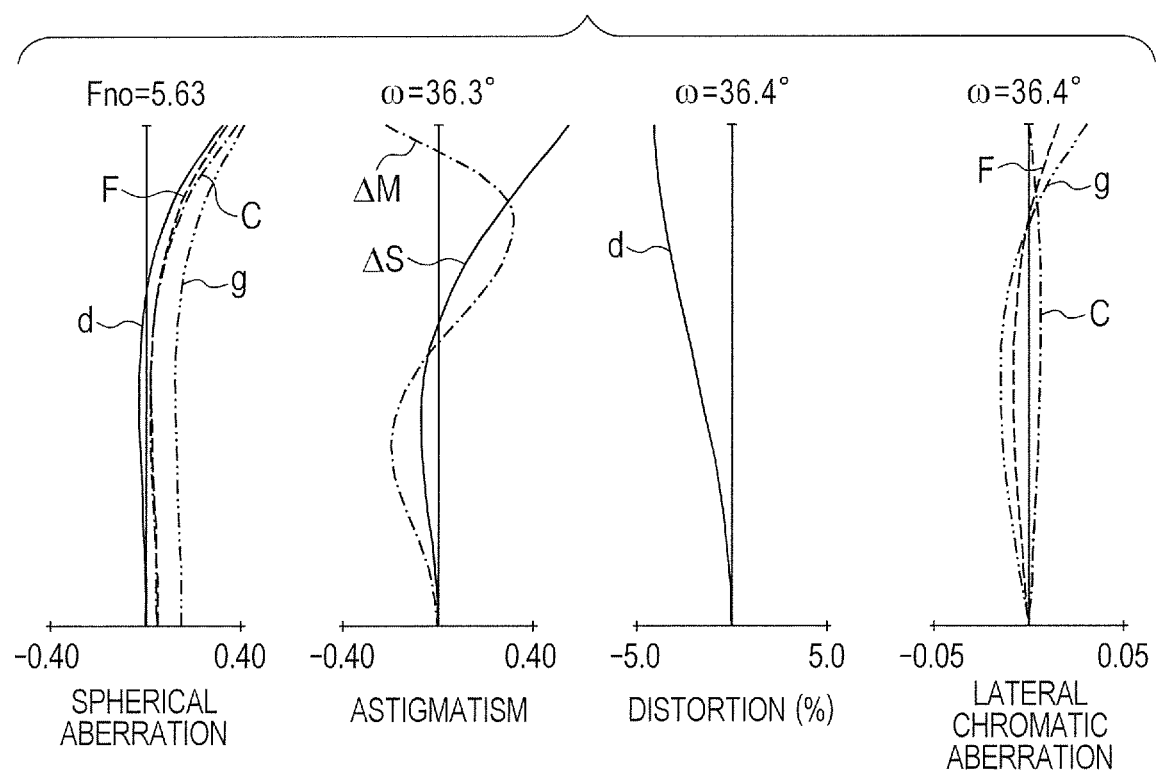
FIG. 2A depicts aberration graphs of the lens in Example 1 in which the rear converter optical system is mounted on the main lens system and which is set to a wide angle end and infinity focus.
Figure 2B:
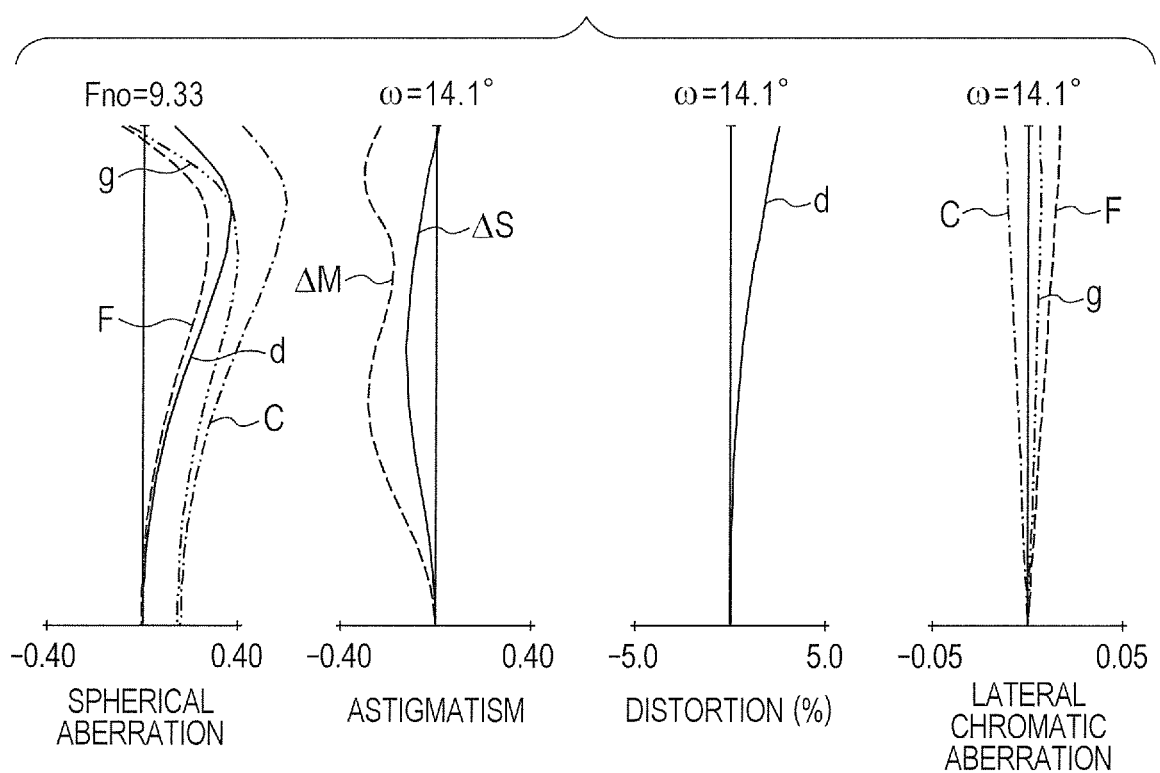
FIG. 2B depicts aberration graphs of the lens in Example 1 in which the rear converter optical system is mounted on the main lens system and which is set to a telephoto end and infinity focus.

FIG. 1 is a lens cross-sectional diagram in the case where a rear converter optical system in Example 1 of the present invention is mounted on the image side of the main lens system. FIGS. 2A and 2B depict graphs of longitudinal aberrations at a wide angle end and a telephoto end in infinity focus in the case where the rear converter optical system in Example 1 of the present invention is mounted on the image side of the main lens system. In Example 1, the image circle of the main lens system is expanded 1.58 times by mounting the rear converter optical system.

Figure 3:
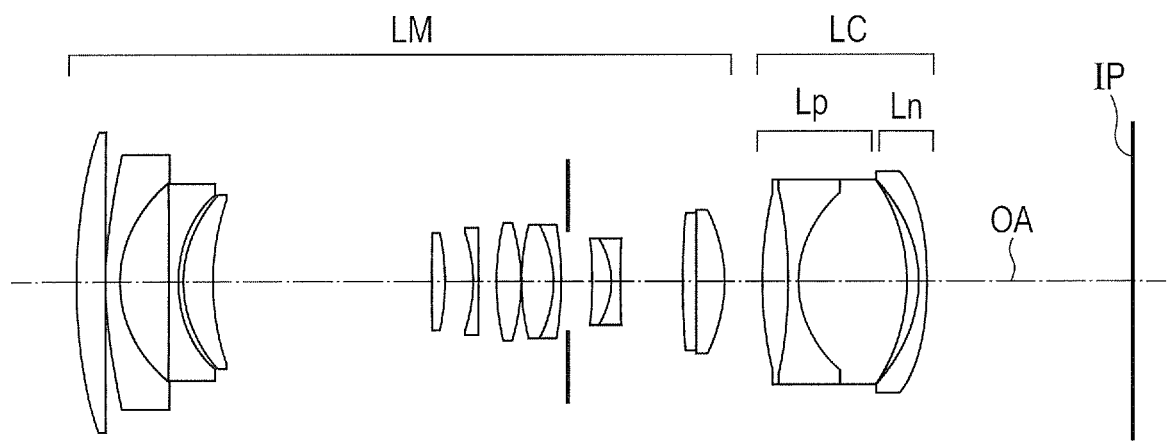
FIG. 3 is a lens cross-sectional diagram in Example in the case where a rear converter optical system is mounted on the main lens system.
Figure 4A:
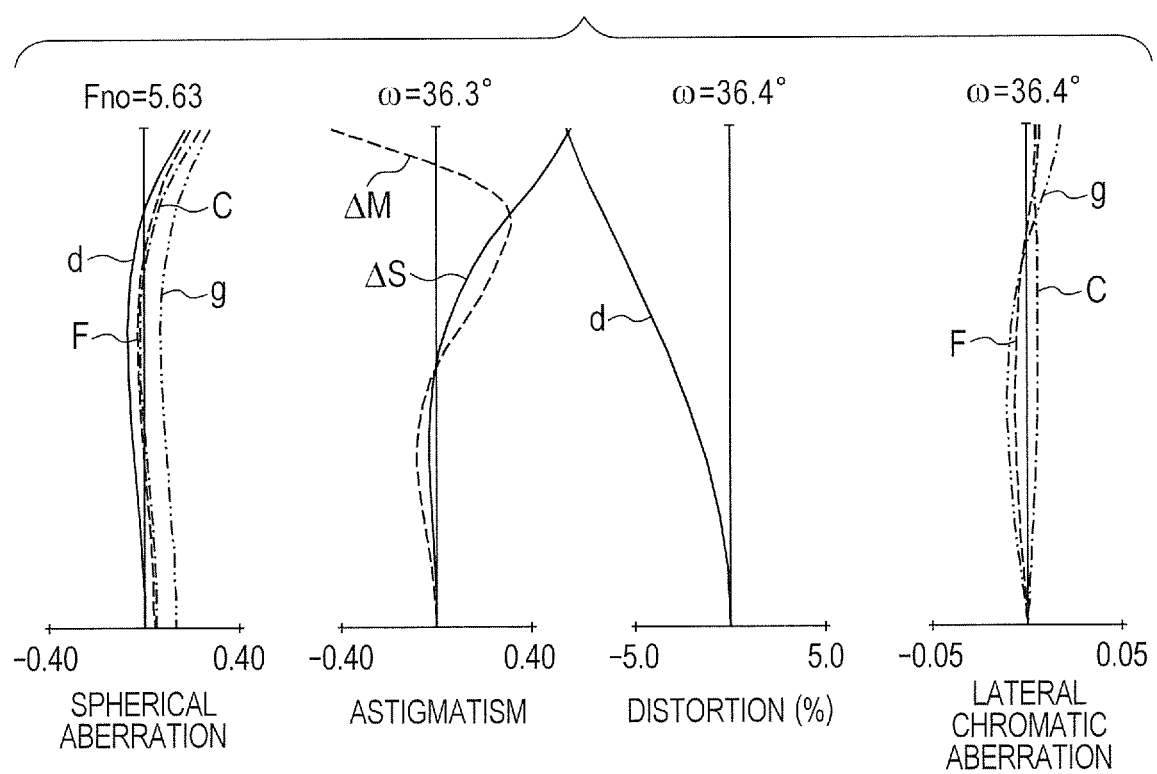
FIG. 4A depicts aberration graphs of the lens in Example 2 in which the rear converter optical system is mounted on the main lens system and which is set to a wide angle end and infinity focus.
Figure 4B:
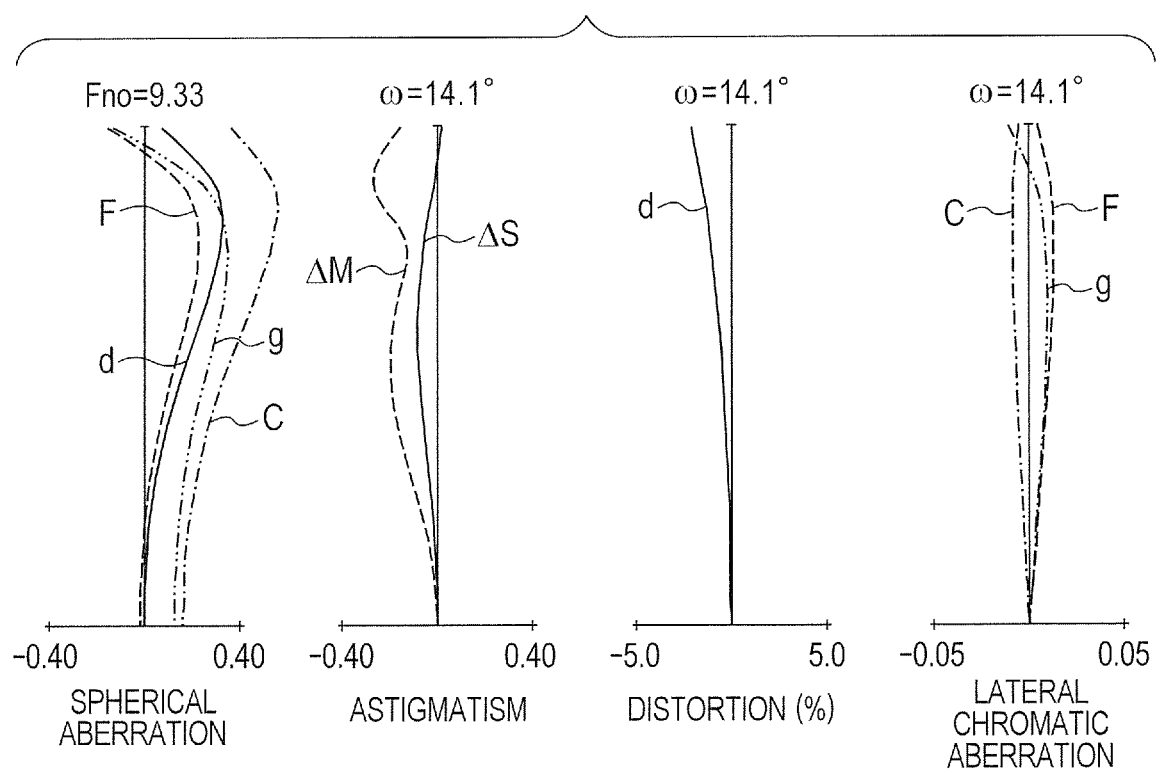
FIG. 4B depicts aberration graphs of the lens in Example 2 in which the rear converter optical system is mounted on the main lens system and which is set to a telephoto end and infinity focus.

FIG. 3 is a lens cross-sectional diagram in the case where a rear converter optical system in Example 2 of the present invention is mounted on the image side of the main lens system. FIGS. 4A and 4B depict graphs of longitudinal aberrations at a wide angle end and a telephoto end in infinity focus in the case where the rear converter optical system in Example 2 of the present invention is mounted on the image side of the main lens system. In Example 2, the image circle of the main lens system is expanded 1.58 times by mounting the rear converter optical system.

Figure 5:
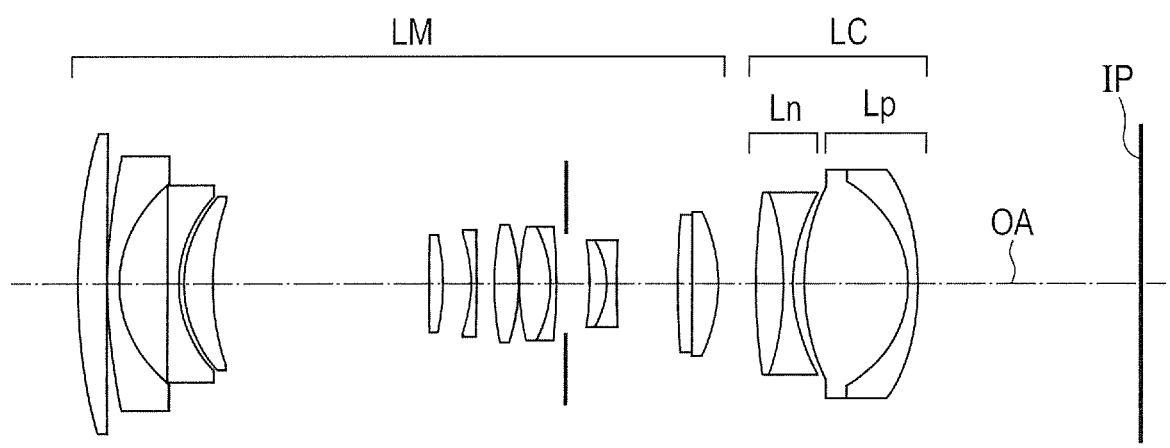
FIG. 5 is a lens cross-sectional diagram in Example in the case where a rear converter optical system is mounted on the main lens system.
Figure 6A:
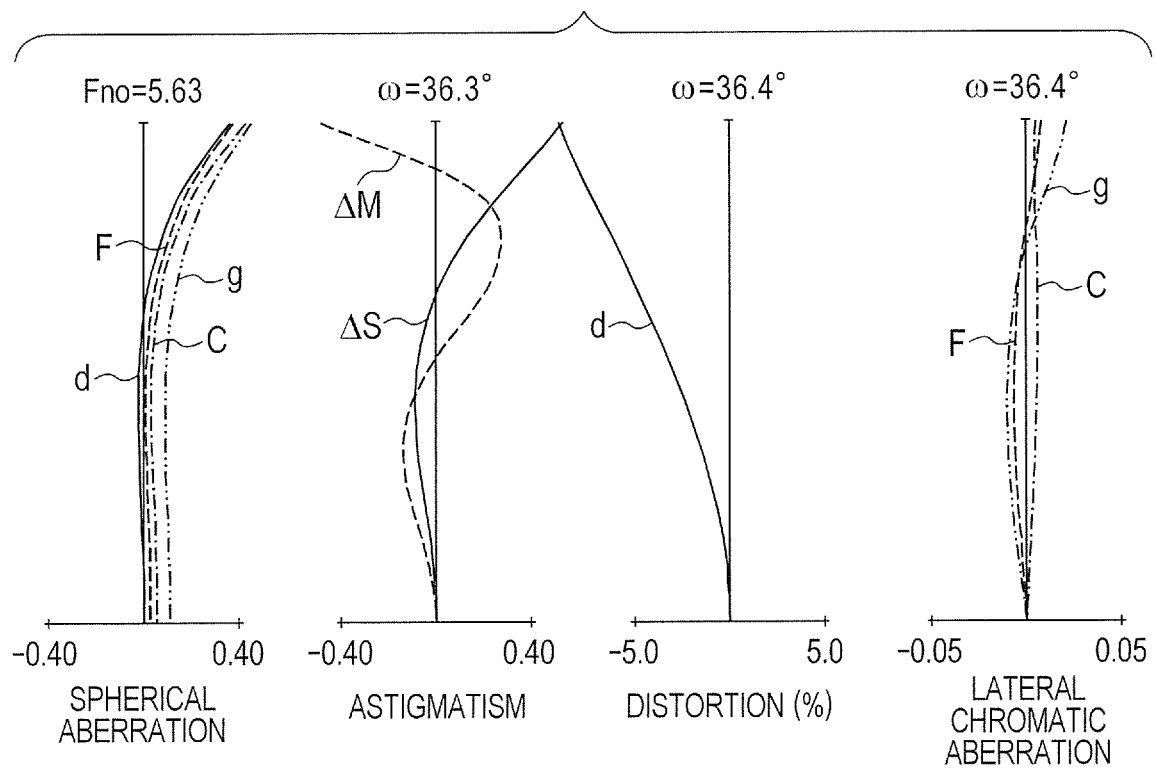
FIG. 6A depicts aberration graphs of the lens in Example 3 in which the rear converter optical system is mounted on the main lens system and which is set to a wide angle end and infinity focus.
Figure 6B:
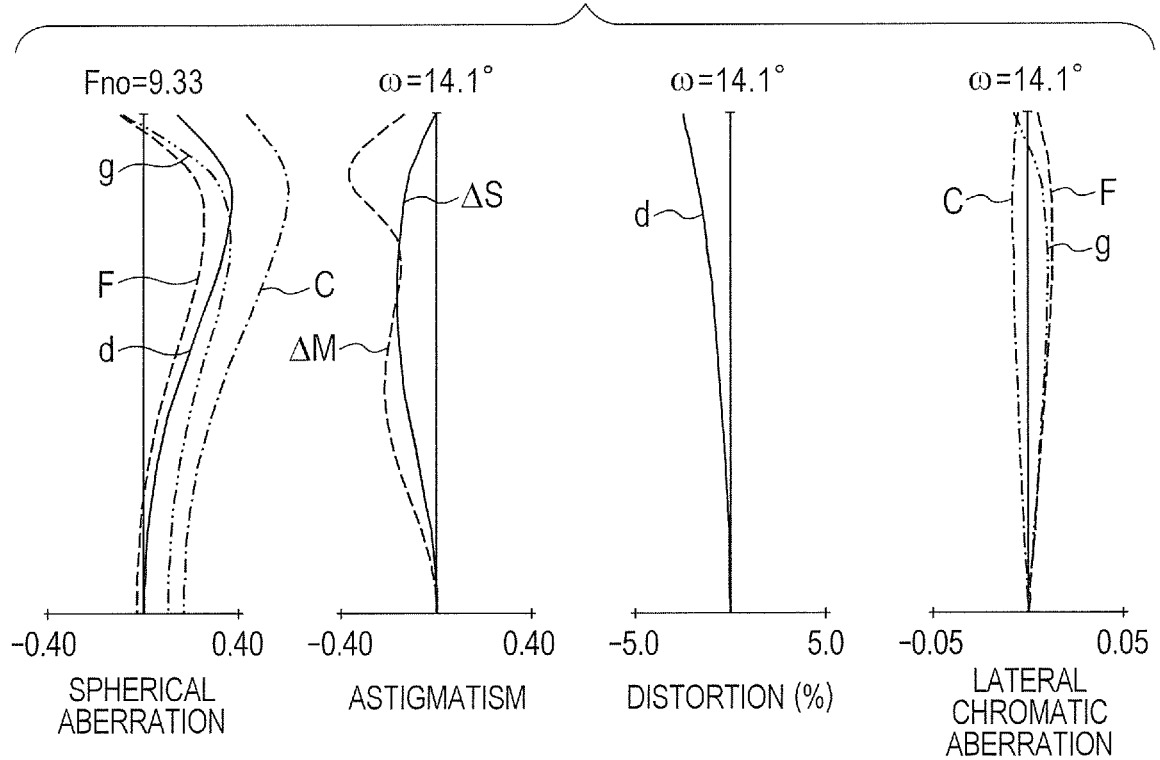
FIG. 6B depicts aberration graphs of the lens in Example 3 in which the rear converter optical system is mounted on the main lens system and which is set to a telephoto end and infinity focus.

FIG. 5 is a lens cross-sectional diagram in the case where a rear converter optical system in Example 3 of the present invention is mounted on the image side of the main lens system. FIGS. 6A and 6B depict graphs of longitudinal aberrations at a wide angle end and a telephoto end in infinity focus in the case where the rear converter optical system in Example 3 of the present invention is mounted on the image side of the main lens system. In Example 3, the image circle of the main lens system is expanded 1.58 times by mounting the rear converter optical system.

Figure 7:
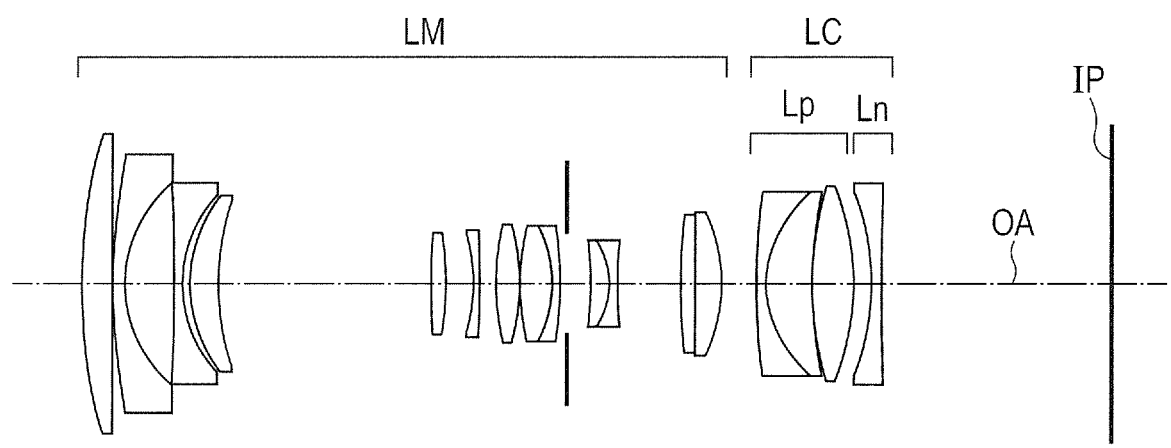
FIG. 7 is a lens cross-sectional diagram in Example 4 in the case where a rear converter optical system is mounted on the main lens system.
Figure 8A:
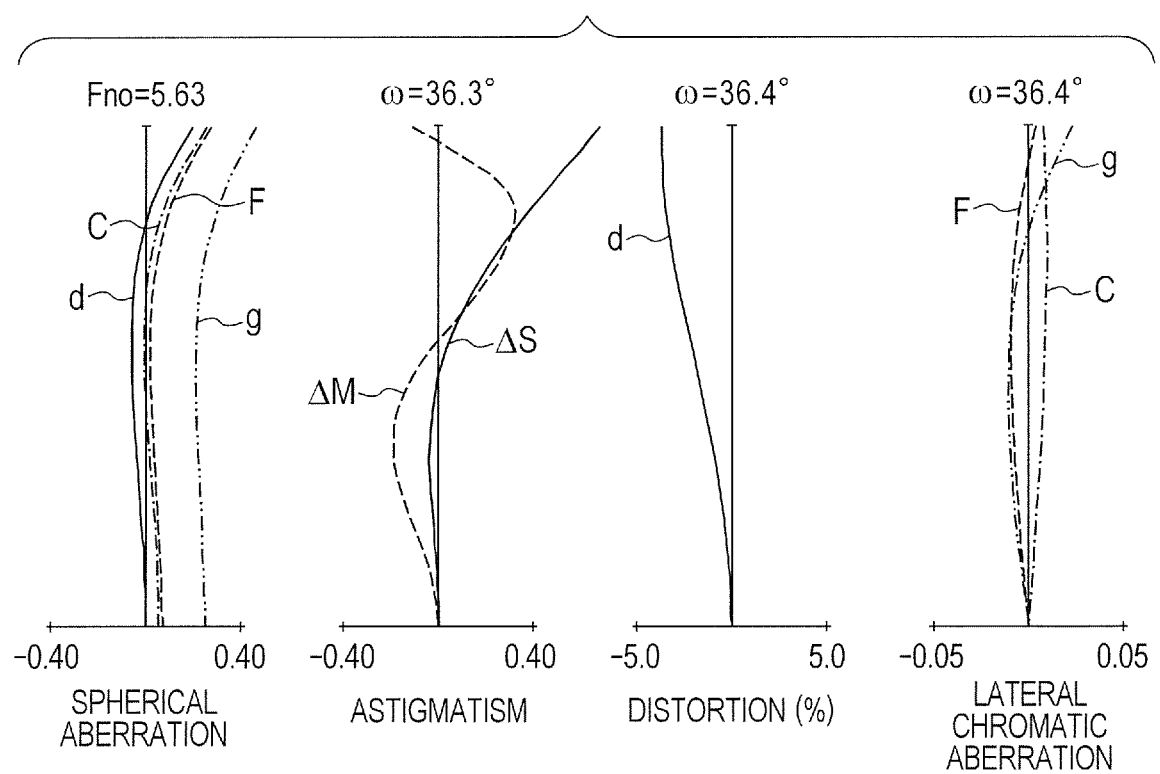
FIG. 8A depicts aberration graphs of the lens in Example 4 in which the rear converter optical system is mounted on the main lens system and which is set to a wide angle end and infinity focus.
Figure 8B:
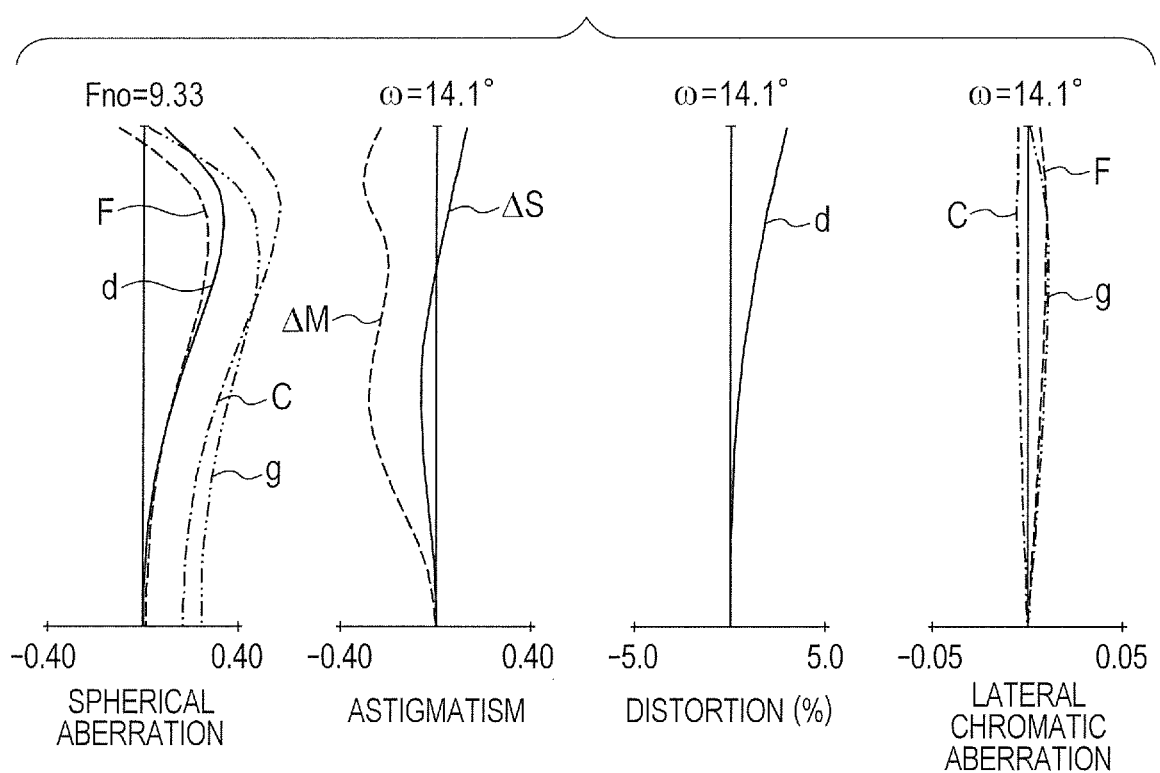
FIG. 8B depicts aberration graphs of the lens in Example 4 in which the rear converter optical system is mounted on the main lens system and which is set to a telephoto end and infinity focus.

FIG. 7 is a lens cross-sectional diagram in the case where a rear converter optical system in Example 4 of the present invention is mounted on the image side of the main lens system. FIGS. 8A and 8B depict graphs of longitudinal aberrations at a wide angle end and a telephoto end in infinity focus in the case where the rear converter optical system in Example 4 of the present invention is mounted on the image side of the main lens system. In Example 4, the image circle of the main lens system is expanded 1.58 times by mounting the rear converter optical system.

Figure 9:
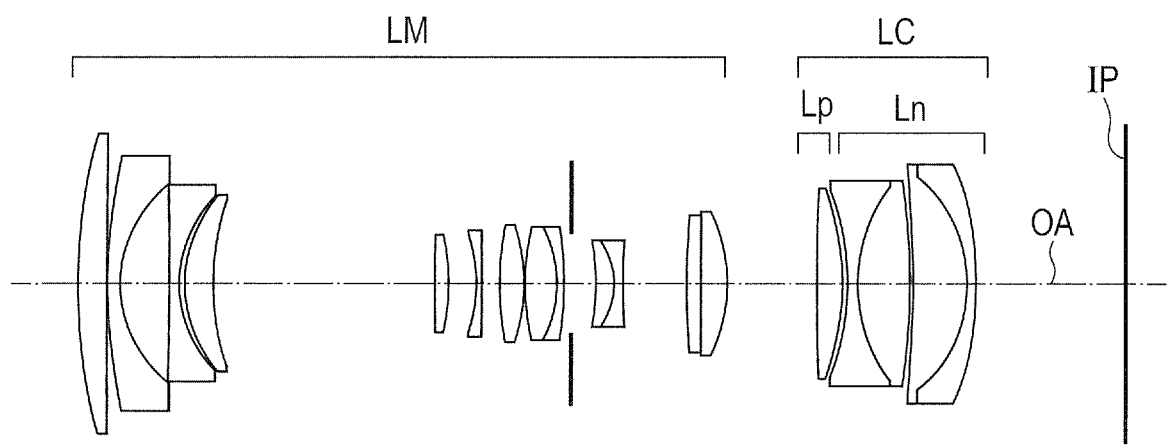
FIG. 9 is a lens cross-sectional diagram in Example 5 in the case where a rear converter optical system is mounted on the main lens system.
Figure 10A:
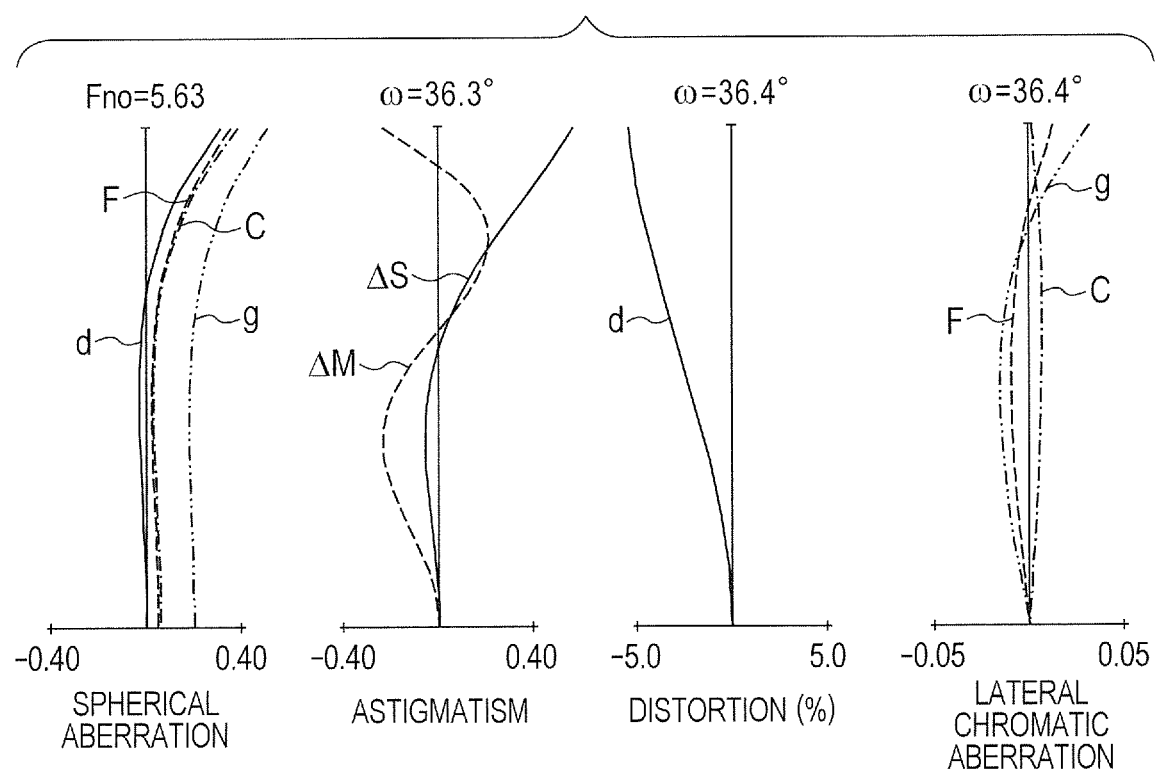
FIG. 10A depicts aberration graphs of the lens in Example 5 in which the rear converter optical system is mounted on the main lens system and which is set to a wide angle end and infinity focus.
Figure 10B:
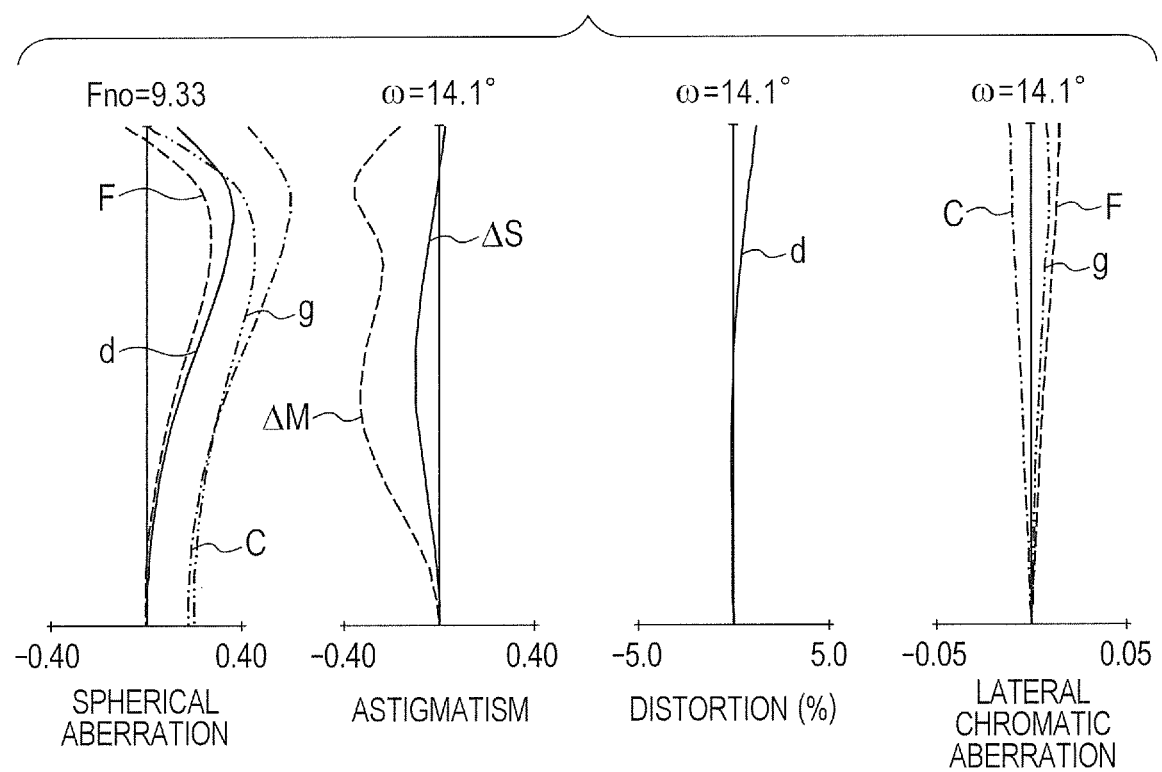
FIG. 10B depicts aberration graphs of the lens in Example 5 in which the rear converter optical system is mounted on the main lens system and which is set to a telephoto end and infinity focus.

FIG. 9 is a lens cross-sectional diagram in the case where a rear converter optical system in Example 5 of the present invention is mounted on the image side of the main lens system. FIGS. 10A and 10B depict graphs of longitudinal aberrations at a wide angle end and a telephoto end in infinity focus in the case where the rear converter optical system in Example 5 of the present invention is mounted on the image side of the main lens system. In Example 5, the image circle of the main lens system is expanded 1.58 times by mounting the rear converter optical system.

Figure 11:
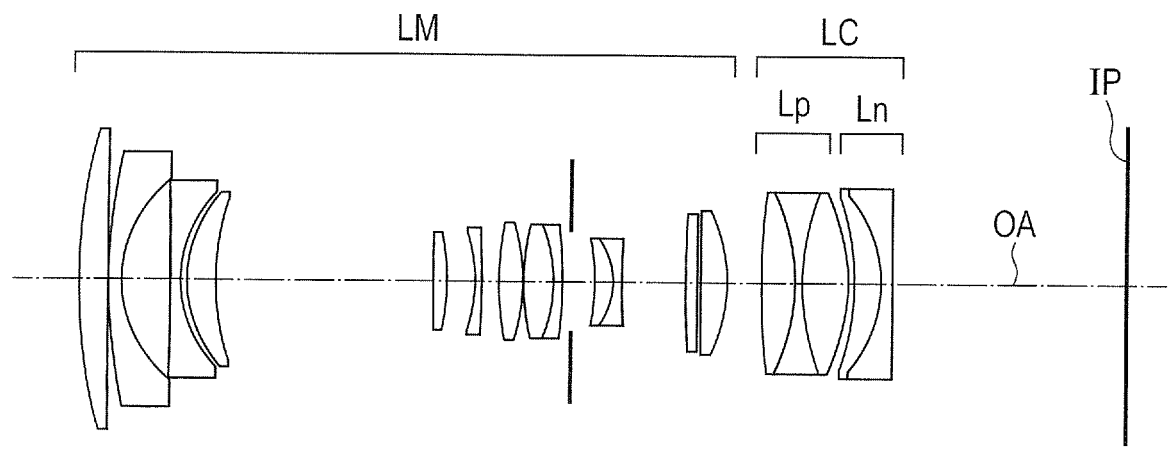
FIG. 11 is a lens cross-sectional diagram in Example 6 in the case where a rear converter optical system is mounted on the main lens system.
Figure 12A:
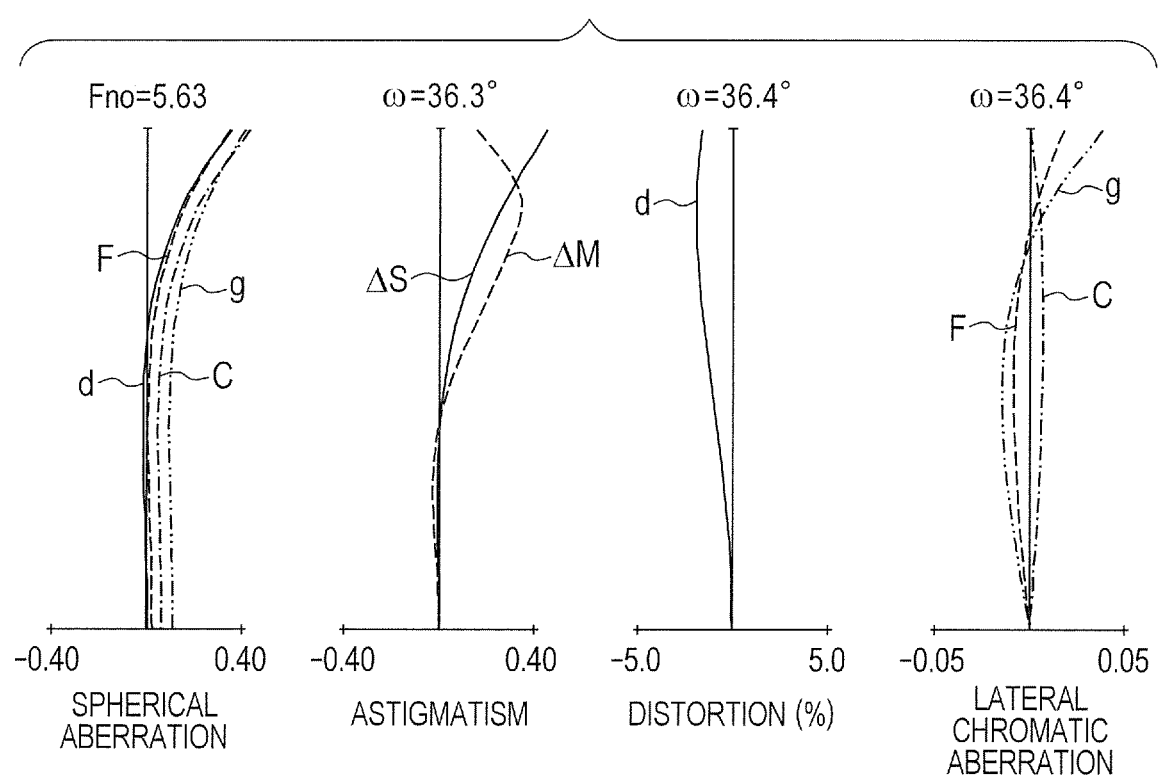
FIG. 12A depicts aberration graphs of the lens in Example 6 in which the rear converter optical system is mounted on the main lens system and which is set to a wide angle end and infinity focus.
Figure 12B:
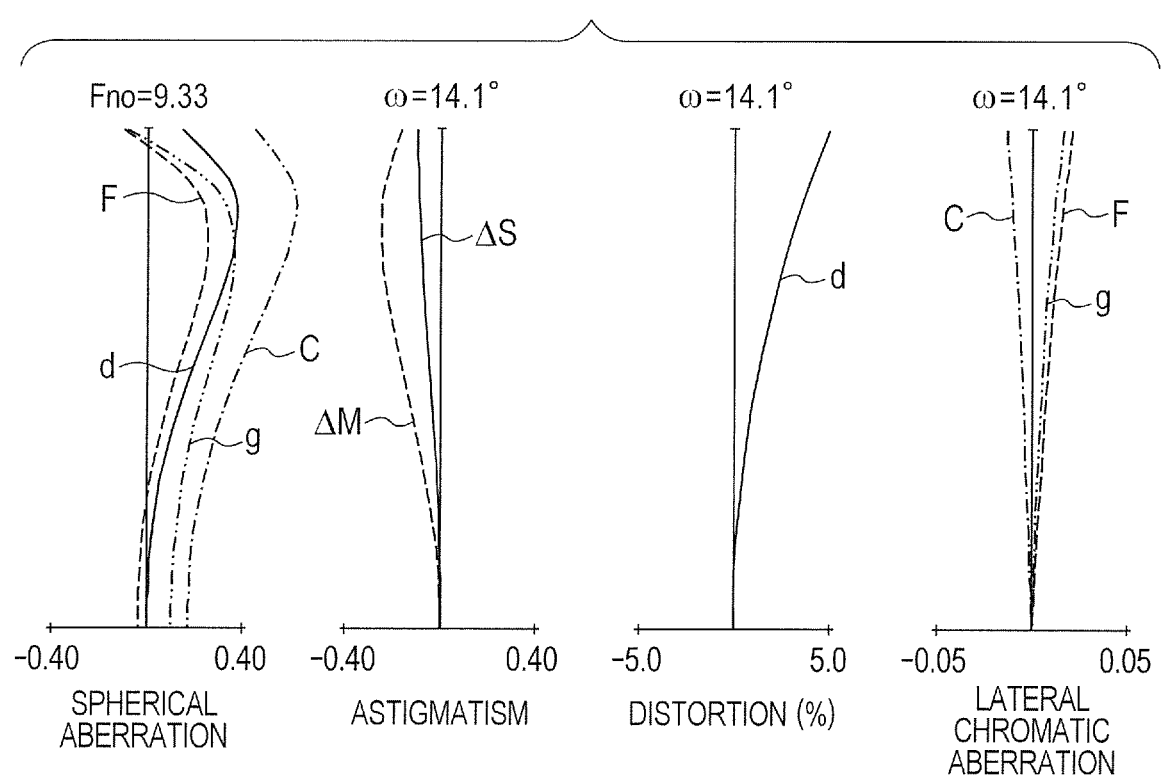
FIG. 12B depicts aberration graphs of the lens in Example 6 in which the rear converter optical system is mounted on the main lens system and which is set to a telephoto end and infinity focus.

FIG. 11 is a lens cross-sectional diagram in the case where a rear converter optical system in Example 6 of the present invention is mounted on the image side of the main lens system. FIGS. 12A and 12B depict graphs of longitudinal aberrations at a wide angle end and a telephoto end in infinity focus in the case where the rear converter optical system in Example 6 of the present invention is mounted on the image side of the main lens system. In Example 6, the image circle of the main lens system is expanded 1.58 times by mounting the rear converter optical system.

Each of the rear converter optical systems in Examples 1, 2, 4, 5, and 6 includes a subgroup Lp with a positive refractive power and a subgroup Ln with a negative refractive power which are arranged, in this order from the object side to the image side, at the widest air distance from each other in the rear converter optical system. The rear converter optical system in Example 3 includes a subgroup Ln with a negative refractive power and a subgroup Lp with a positive refractive power which are arranged, in this order from the object side to the image side, at the widest air distance from each other in the rear converter optical system.

Figure 13:
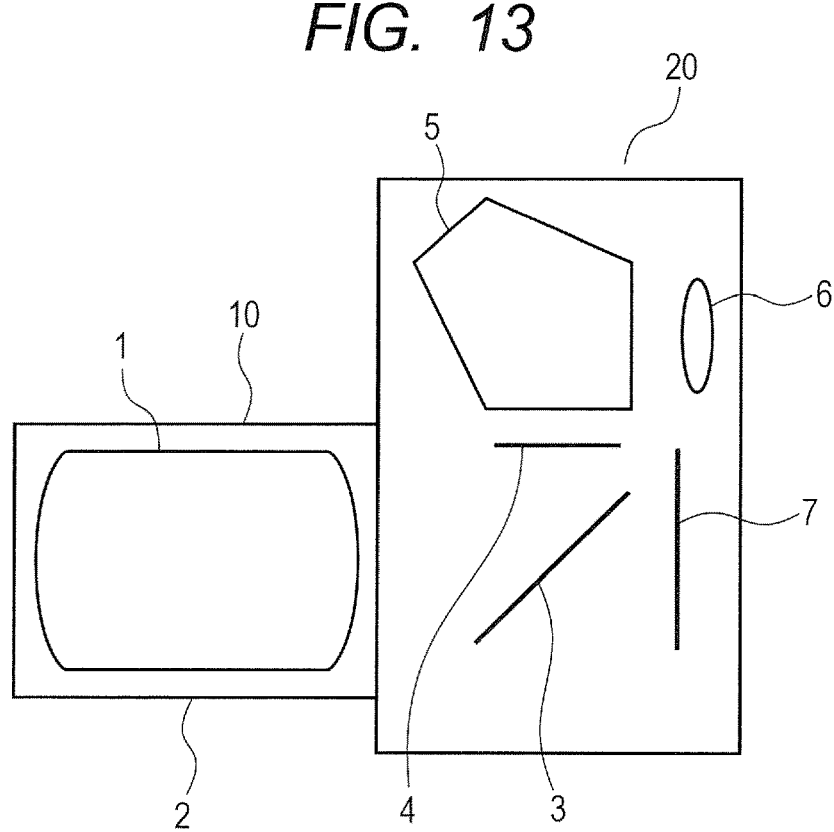
FIG. 13 is a schematic view of a main portion of an imaging apparatus according to the present invention.
Figure 14:
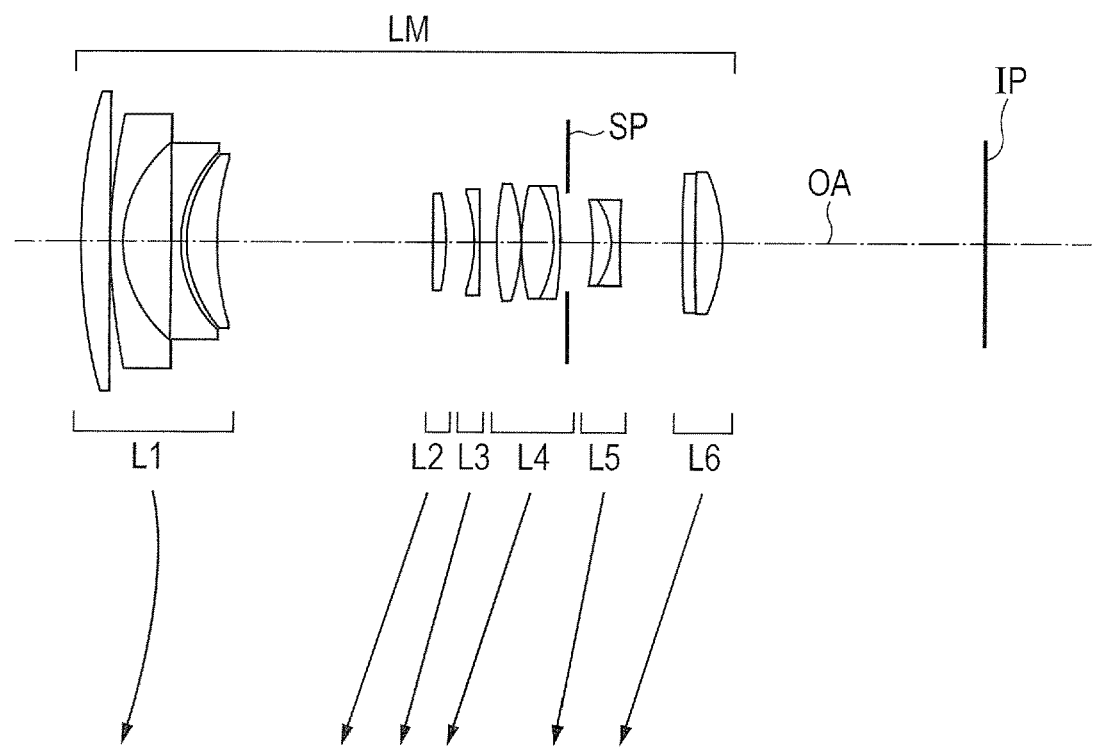
FIG. 14 is a cross-sectional view of a main lens system at a wide angle end, the main lens system used in the lenses of Examples.

FIG. 13 is a schematic diagram of a main portion of an imaging apparatus in which the rear converter optical system of the present invention is provided on the image side of the main lens system. FIG. 14 is a lens cross-sectional diagram of the main lens system at the wide angle end, the main lens system being an example of a system used in Examples.

Although the cases where the main lens system used in Examples is a zoom lens are described, the present invention is not limited to these cases. The main lens system may be any type of zoom lens or an imaging optical system with a fixed focal length.

The reference sign LC in the lens cross-sectional diagrams represents the rear converter optical system. The reference sign LM represents the main lens system. The rear converter optical system LC includes the subgroup Lp with the positive refractive power and the subgroup Ln with the negative refractive power which are arranged at the widest air distance from each other in the rear converter optical system. The reference sign IP represents an image plane, and an imaging surface of a solid-state image pickup element (photoelectric conversion element) such as a CCD sensor or a CMOS sensor is located on the image plane when the rear converter optical system is used as an imaging optical system of a video camera or a digital still camera. Moreover, the image plane corresponds to a film surface when the rear converter optical system is used as an imaging optical system of a camera for a silver halide film.

As illustrated in FIG. 14, the main lens system LM includes the following lens units arranged from the object side to the image side in the order of the description. The main lens system LM includes a first lens unit L1 with a negative refractive power, a second lens unit L2 with a positive refractive power, a third lens unit L3 with a negative refractive power, a fourth lens unit L4 with a positive refractive power, a fifth lens unit L5 with a negative refractive power, and a sixth lens unit L6 with a positive refractive power.

The reference sign SP represents an aperture stop. The reference sign IP represents the image plane. The reference sign OA represents an optical axis. During zooming from the wide angle end to the telephoto end, the first lens unit L1 moves along a trajectory convex toward the image side as illustrated by the arrow. The second lens unit L2 to the sixth lens unit G6 move toward the object side.

In each spherical aberration graph, the reference sign d with the solid line is the d line (wavelength 587.6 nm), g with the two-dot chain line is the g line (wavelength 435.8 nm), C with the one-dot chain line is the C line (wavelength 656.3 nm), and F with the broken line is the F line (wavelength 486.1 nm). In each astigmatism graph, the reference sign ΔM with the dotted line is the meridional image plane at the d line and ΔS with the solid line is the sagittal image plane at the d line. The distortion at the d line is depicted. The lateral chromatic aberration is expressed by using the g line, the F line, and the C line. The reference sign ω is the half angle of view (degrees) and Fno is the F number.

Note that the wide angle end and the telephoto end of the main lens system LM in Examples described below each refer to a zoom position in the case where a magnification varying lens unit is located at one of two ends of a range in which the magnification varying lens unit is allowed to move along the optical axis by a mechanism.

The rear converter optical system LC of the present invention is mounted on the image side of the main lens system LM to increase the focal length of the entire system of the zoom lens and expand the image circle (effective imaging area). The rear converter optical system LC includes the subgroup Lp with the positive refractive power and the subgroup Ln with the negative refractive power which are arranged at the widest air distance from each other in the rear converter optical system.

In Examples described below, the rear converter optical system LC includes two positive lenses and two negative lenses. Note that the rear converter optical system LC only needs to include a positive lens and a negative lens.

The rear converter optical system of the present invention is mounted on the image side of the main lens system LM to increase the focal length of the entire system. The effective diameter of the imaging area of the main lens system LM is represented by Φim. The effective diameter of the lens surface closest to the image side of the rear converter optical system is represented by Φcr. The lateral magnification of the rear converter optical system LC in the case where the rear converter optical system LC is mounted on the main lens system LM is represented by βc. The backfocus in the case where the rear converter optical system LC is mounted on the main lens system LM is represented by skc.

In this case, the following conditional expressions are satisfied:

$$0.4 < \Phi cr/(\Phi im \times \beta c) < 1.0 \quad (1); \text{ and}$$

$$0.8 < (\Phi cr/2 + 0.35 \times skc)/(\Phi im \times \beta c/2) < 1.5 \quad (2).$$

Note that the effective diameter on the lens surface refers to the diameter, on the lens surface, to positions farthest from the optical axis, out positions of light beam passing through the lens surface. Alternatively, the effective diameter of the lens surface may be the diameter of a portion polished on the lens surface, the diameter determined by a mechanical member holding the lens in a lens barrel, or an outer diameter of the lens.

Next, technical meanings of the conditional expressions (1) and (2) are described. The conditional expression (1) is an expression representing relationships among the effective diameter of the lens surface closest to the image side of the rear converter optical system LC, the diameter of the image circle (effective diameter of the imaging area) of the main lens system LM, and the lateral magnification of the rear converter optical system LC. A value obtained by multiplying the image circle of the main lens system LM by the magnification of the rear converter optical system LC represents the image circle in the case where the rear converter optical system LC is mounted.

When $\Phi cr/(\Phi im \times \beta c)$ exceeds the upper limit of the conditional expression (1), the lenses included in the rear converter optical system LC become relatively large, and the rear converter optical system LC itself becomes large. When $\Phi cr/(\Phi im \times \beta c)$ falls below the lower limit of the conditional expression (1), although the size reduction of the lenses included in the rear converter optical system LC is facilitated, the incidence height at which off-axis light beams pass through the rear converter optical system LC decreases, and correction of particularly the off-axis aberrations becomes difficult.

The conditional expression (2) is an expression describing a relationship among the effective diameter of the lens surface closest to the image side of the rear converter optical system LC, the backfocus, and the like. In an imaging element used in an imaging apparatus such as a digital camera, micro-lenses for collecting imaging light beams are arranged over the entire surface (on the object side) of the imaging element. The micro-lenses have such a characteristic that the light collection efficiency varies depending on the angle of incidence. Accordingly, in order to efficiently collect the imaging light beams, it is preferable that the angle of incidence is within a certain range.

The conditional expression (2) is derived in view of such circumstances. When $(\Phi cr/2 + 0.35 \times skc)/(\Phi im \times \beta c/2)$ exceeds the upper limit of the conditional expression (2) or falls below the lower limit thereof, the variation in the angle of incidence of the light beam on the imaging surface becomes large as described above and this is not preferable. Particularly, when $(\Phi cr/2 + 0.35 \times skc)/(\Phi im \times \beta c/2)$ exceeds the upper limit, the effective diameters of the lenses in the rear converter optical system LC resultantly increase and the entire optical system becomes large, which is not preferable. When $(\Phi cr/2 + 0.35 \times skc)/(\Phi im \times \beta c/2)$ falls below the lower limit, the light collection efficiency in the case where the imaging element is used on the imaging surface greatly decreases and this is not preferable.

As described above, the rear converter optical system LC capable of changing the image circle can have high optical performances while achieving the size reduction, by satisfying the conditional expressions (1) and (2). More preferably, the numerical value ranges of the conditional expressions (1) and (2) are set as follows:

$$0.5 < \Phi cr/(\Phi im \times \beta c) < 0.9 \quad (1a); \text{ and}$$

$$0.9 < (\Phi cr/2 + 0.35 \times skc)/(\Phi im \times \beta c/2) < 1.3 \quad (2a).$$

Even more preferably, the numerical value ranges of the conditional expressions (1a) and (2a) are set as follows:

$$0.55 < \Phi cr/(\Phi im \times \beta c) < 0.75 \quad (1b); \text{ and}$$

$$1.00 < (\Phi cr/2 + 0.35 \times skc)/(\Phi im \times \beta c/2) < 1.25 \quad (2b).$$

In addition, the rear converter optical system of the present invention is mounted on the image side of the main lens system LM to expand the imaging area of the main lens system LM. The effective diameter of the imaging area in the case where the rear converter optical system is mounted on the image side of the main lens system LM is represented by 2YMax. In this case, the following conditional expressions are satisfied:

$$0.8 < \Phi cr/Y\max < 2.0 \quad (3); \text{ and}$$

$$0.8 < (\Phi cr/2 + 0.35 \times skc)/Y\max < 1.5 \quad (4).$$

Next, technical meanings of the conditional expressions (3) and (4) are described. The conditional expression (3) represents a relationship between the effective diameter of the lens surface closest to the image side of the rear converter optical system LC and the maximum image height Ymax (maximum effective diameter 2Ymax) on the imaging surface. When $\Phi cr/Y$max exceeds the upper limit of the conditional expression (3), the lenses included in the rear converter optical system LC become relatively large and the rear converter optical system LC itself becomes large. When $\Phi cr/Y$max falls below the lower limit of the conditional expression (3), although the lenses included in the rear converter optical system LC can be made smaller, the incidence height at which off-axis light beams pass through the rear converter optical system LC decreases, and correction of particularly the off-axis aberrations becomes difficult.

The conditional expression (4) is an expression describing a relationship among the effective diameter of the lens surface closest to the image side of the rear converter optical system LC, the backfocus, and the like. As described above, in an imaging element used in an imaging apparatus such as a digital camera, micro-lenses for collecting imaging light beams are arranged over the entire surface (on the object side) of the imaging element. The micro-lenses have such a characteristic that the light collection efficiency varies depending on the angle of incidence. Accordingly, in order to efficiently collect the imaging light beams, it is preferable that the angle of incidence is within a certain range.

The conditional expression (4) is derived in view of such circumstances. When $(\Phi cr/2 + 0.35 \times skc)/Y$max exceeds the upper limit of the conditional expression (4) or falls below the lower limit thereof, the variation in the angle of incidence of the light beam on the imaging surface becomes large as described above and this is not preferable. Particularly, when $(\Phi cr/2 + 0.35 \times skc)/Y$max exceeds the upper limit, the effective diameters of the lenses in the rear converter optical system LC resultantly increase and the entire optical system becomes large, which is not preferable. When $(\Phi cr/2 + 0.35 \times skc)/Y$max falls below the lower limit, the light collection efficiency in the case where the imaging element is used on the imaging surface greatly decreases and this is not preferable.

As described above, the rear converter optical system LC capable of changing the image circle can have high optical performances while achieving the size reduction, by satisfying the conditional expressions (3) and (4). More preferably, the numerical value ranges of the conditional expressions (3) and (4) are set as follows:

$$1.0 < \Phi cr/Y\max < 1.7 \quad (3a); \text{ and}$$

$$0.9 < (\Phi cr/2 + 0.35 \times skc)/Y\max < 1.3 \quad (4a).$$

Even more preferably, the numerical value ranges of the conditional expressions (3a) and (4a) are set as follows:

$$1.1 < \Phi cr/Y\max < 1.5 \quad (3b); \text{ and}$$

$$1.00 < (\Phi cr/2 + 0.35 \times skc)/Y\max < 1.25 \quad (4b).$$

In addition, the rear converter optical system of the present invention preferably satisfies one or more of the following conditional expressions. The effective diameter of the lens surface closest to the object side of the rear converter optical system LC is represented by $\Phi cf$. The effective diameter of the imaging area in the case where the rear converter optical system LC is mounted on the image side of the main lens system LM is represented by $\Phi ic$. The rear converter optical system LC includes the subgroup Lp with the positive refractive power and the subgroup Ln with the negative refractive power which are arranged, in this order from the object side to the image side, at the widest air distance from each other in the rear converter optical system LC. The focal length of the subgroup Lp is represented by fp and the focal length of the subgroup Ln is represented by fn. In this case, one or more of the following conditional expressions is preferably satisfied:

$$1.0 < \Phi cr/\Phi cf < 1.5 \quad (5);$$

$$1.4 < \beta c < 2.0 \quad (6);$$

$$1.4 < \Phi ic/\Phi im < 2.0 \quad (7);$$

$$0.7 < skc/(\Phi ic/2) < 1.8 \quad (8); \text{ and}$$

$$1.0 < |fp/fn| < 5.0 \quad (9).$$

Next, the technical meanings of these conditional expressions are described. The conditional expression (5) relates to a ratio of the effective diameter of the lens surface closest to the object side of the rear converter optical system LC to that on the lens surface closest to the image side of the rear converter optical system LC. When $\Phi cr/\Phi cf$ falls below the lower limit of the conditional expression (5), the effective diameter of a rear lens relatively decreases and the incidence height at which off-axis light beams pass through the rear lens decreases, which makes correction of the off-axis aberrations difficult. Otherwise, the effective diameter of a front lens relatively increases and the entire system of the zoom lens becomes large, which is not preferable. When $\Phi cr/\Phi cf$ exceeds the upper limit of the conditional expression (5), the effective diameter of the rear lens relatively increases and the entire system of the zoom lens becomes large, which is not preferable.

The conditional expression (6) relates to the lateral magnification of the rear converter optical system LC. When $\beta c$ falls below the lower limit of the conditional expression (6), the effect of changing the picture size in the rear converter optical system LC decreases and this is not preferable. On the other hand, when $\beta c$ exceeds the upper limit of the conditional expression (6), although the effect of changing the picture size increases, the refractive power of the rear converter optical system LC itself increases and the aberration correction becomes difficult. Furthermore, the effect of increasing the aberrations of the main lens system LM increases and this is not preferable.

The conditional expression (7) relates to a ratio of the image circle in the case where the rear converter optical system LC is mounted to the image circle of the main lens system LM. When $\Phi ic/\Phi im$ falls below the lower limit of the conditional expression (7), the effect of changing the picture size in the rear converter optical system LC decreases and this is not preferable. On the other hand, when Φic/Φim exceeds the upper limit of the conditional expression (7), although the effect of changing the picture size increases, the refractive power of the rear converter optical system LC itself increases and the aberration correction becomes difficult. Furthermore, the effect of increasing the aberrations of the main lens system LM increases and this is not preferable.

The conditional expression (8) relates to a ratio of the backfocus to the image circle in the case where the rear converter optical system LC is mounted. When skc/(Φic/2) falls below the lower limit of the conditional expression (8), the backfocus relatively decreases and the image circle becomes large. In this case, the angle of a ray exiting the rear converter optical system LC toward the image plane increases and the exit pupil distance decreases, which is not preferable.

When skc/(Φic/2) exceeds the upper limit of the conditional expression (8), the backfocus increases and the image circle becomes small. In this case, the angle of a ray exiting the rear converter optical system LC toward the image plane decreases and the exit pupil distance increases, thereby increasing the effective diameters of the lenses in the rear converter optical system LC, which is not preferable.

The conditional expression (9) relates to a ratio of the focal length of the subunit Lp with the positive refractive power to the focal length of the subgroup Ln with the negative refractive power, the subgroups Lp, Ln arranged in the rear converter optical system LC. When |fp/fn| exceeds the upper limit of the conditional expression (9), the positive refractive power relatively decreases and the negative refractive power relatively increases. Since the rear converter optical system LC as a whole has a negative refractive power, a subgroup with a positive refractive power is necessary for aberration correction.

When the positive refractive power decreases, the effect of aberration correction obtained in this subgroup decreases and this is not preferable. On the other hand, when |fp/fn| falls below the lower limit of the conditional expression (9), the positive refractive power relatively increases and the negative refractive power relatively decreases. In this case, although the aberrations can be corrected more easily, the negative refractive power of the rear converter optical system LC as a whole decreases and this make it more difficult to obtain the required magnification varying effect and picture size expanding effect, which is not preferable. More preferably, the numerical value ranges of the conditional expressions (5) to (9) are set as follows:

$$1.0<\Phi cr/\Phi cf<1.4 \quad (5a);$$

$$1.5<\beta c<1.8 \quad (6a);$$

$$1.5<\Phi ic/\Phi im<1.8 \quad (7a);$$

$$0.8<skc/(\Phi ic/2)<1.6 \quad (8a); \text{ and}$$

$$1.5<|fp/fn|<4.0 \quad (9a).$$

Even more preferably, the numerical value ranges of the conditional expressions (5a) to (9a) are set as follows:

$$1.05<\Phi cr/\Phi cf<1.30 \quad (5b);$$

$$1.55<\beta c<1.65 \quad (6b);$$

$$1.55<\Phi ic/\Phi im<1.65 \quad (7b);$$

$$0.9<skc/(\Phi ic/2)<1.5 \quad (8b); \text{ and}$$

$$1.8<|fp/fn|<3.0 \quad (9b).$$

Next, the lens configuration of the rear converter optical system LC in each Example is described. Data on the numerical values described below is data on values in the numerical value examples to be described later which are expressed in the unit of mm. This applies to all of the following examples.

EXAMPLE 1

The rear converter optical system LC in Example 1 of the present invention is described below with reference to FIG. 1. The rear converter optical system LC in Example 1 includes the subgroup Lp with the positive refractive power and the subgroup Ln with the negative refractive power which are arranged, in this order from the object side to the image side, at the widest air distance from each other in the rear converter optical system LC. The effective diameter Φcr of the lens surface closest to the image side of the rear converter optical system LC is 26.49 mm and the lateral magnification βc of the rear converter optical system LC is 1.58. The backfocus skc in the case where the rear converter optical system LC is mounted on the image side of the main lens system LM is 31.03 mm, and the diameter of the image circle (effective diameter of the imaging area) Φim of the main lens system LM is 27.32 mm.

The rear converter optical system LC is mounted on the image side of the main lens system LM to expand the image circle of the main lens system LM 1.58 times (Φic=43.28). The subgroup Lp of the rear converter optical system LC in Example 1 includes three lenses, specifically, a cemented lens obtained by cementing a positive lens and a negative lens, and a positive lens which are arranged in this order from the object side to the image side. The subgroup Ln includes one lens. The rear converter optical system LC having such a lens configuration is small and can expand the image circle of the main lens system LM 1.58 times while suppressing particularly the off-axis aberrations as seen in the aberration graphs in FIGS. 2A and 2B.

EXAMPLE 2

The rear converter optical system LC in Example 2 of the present invention is described below with reference to FIG. 3. The rear converter optical system LC in Example 2 includes the subgroup Lp with the positive refractive power and the subgroup Ln with the negative refractive power which are arranged, in this order from the object side to the image side, at the widest air distance from each other in the rear converter optical system LC. The effective diameter Φcr of the lens surface closest to the image side of the rear converter optical system LC is 29.44 mm and the lateral magnification βc of the rear converter optical system LC is 1.58. The backfocus skc in the case where the rear converter optical system LC is mounted on the image side of the main lens system LM is 28.01 mm, and the diameter of the image circle (effective diameter of the imaging area) Φim of the main lens system LM is 27.32 mm.

The rear converter optical system LC is mounted on the image side of the main lens system LM to expand the image circle of the main lens system LM 1.58 times (Φic=43.28).

The subgroup Lp of the rear converter optical system LC in Example 2 includes three lenses, specifically, a cemented lens obtained by cementing a positive lens, a negative lens, and a positive lens which are arranged in this order from the object side to the image side. The subgroup Ln includes one lens. The rear converter optical system LC having such a lens configuration is small and can expand the image circle of the main lens system LM 1.58 times while suppressing particularly the off-axis aberrations as seen in the aberration graphs in FIGS. 4A and 4B.

EXAMPLE 3

The rear converter optical system LC in Example 3 of the present invention is described below with reference to FIG. 5. The rear converter optical system LC in Example 3 includes the subgroup Ln with the negative refractive power and the subgroup Lp with the positive refractive power which are arranged, in this order from the object side to the image side, at the widest air distance from each other in the rear converter optical system LC. The effective diameter Φcr of lens surface closest to the image side of the rear converter optical system LC is 30.63 mm and the lateral magnification βc of the rear converter optical system LC is 1.58. The backfocus skc in the case where the rear converter optical system LC is mounted on the image side of the main lens system LM is 30.74 mm, and the diameter of the image circle (effective diameter of the imaging area) Φim of the main lens system LM is 27.32 mm.

The rear converter optical system LC is mounted on the image side of the main lens system LM to expand the image circle of the main lens system LM 1.58 times (Φic=43.28).

The subgroup Ln of the rear converter optical system LC in Example 3 includes two lenses, specifically, a cemented lens obtained by cementing a positive lens and a negative lens which are arranged in this order from the object side to the image side. The subgroup Lp includes a cemented lens obtained by cementing a positive lens and a negative lens. The rear converter optical system LC having such a lens configuration is small and can expand the image circle of the main lens system LM 1.58 times while suppressing particularly the off-axis aberrations as seen in the aberration graphs in FIGS. 6A and 6B.

EXAMPLE 4

The rear converter optical system LC in Example 4 of the present invention is described below with reference to FIG. 7. The rear converter optical system LC in Example 4 includes the subgroup Lp with the positive refractive power and the subgroup Ln with the negative refractive power which are arranged, in this order from the object side to the image side, at the widest air distance from each other in the rear converter optical system LC. The effective diameter Φcr of the lens surface closest to the image side of the rear converter optical system LC is 26.20 mm and the lateral magnification βc of the rear converter optical system LC is 1.58. The backfocus skc in the case where the rear converter optical system LC is mounted on the image side of the main lens system LM is 31.50 mm, and the diameter of the image circle (effective diameter of the imaging area) Φim of the main lens system LM is 27.32 mm.

The rear converter optical system LC is mounted on the image side of the main lens system LM to expand the image circle of the main lens system LM 1.58 times (Φic=43.28).

The subgroup Lp of the rear converter optical system LC in Example 4 includes three lenses, specifically, a cemented lens obtained by cementing a negative lens and a positive lens, and a positive lens which are arranged in this order from the object side to the image side. The subgroup Ln includes one negative lens. The rear converter optical system LC having such a lens configuration is small and can expand the image circle of the main lens system LM 1.58 times while suppressing particularly the off-axis aberrations as seen in the aberration graphs in FIGS. 8A and 8B.

EXAMPLE 5

The rear converter optical system LC in Example 5 of the present invention is described below with reference to FIG. 9. The rear converter optical system LC in Example 5 includes the subgroup Lp with the positive refractive power and the subgroup Ln with the negative refractive power which are arranged, in this order from the object side to the image side, at the widest air distance from each other in the rear converter optical system. The effective diameter Φcr of the lens surface closest to the image side of the rear converter optical system LC is 31.29 mm and the lateral magnification βc of the rear converter optical system LC is 1.58. The backfocus skc in the case where the rear converter optical system LC is mounted on the image side of the main lens system LM is 19.89 mm, and the diameter of the image circle (effective diameter of the imaging area) Φim of the main lens system LM is 27.32 mm.

The rear converter optical system LC is mounted on the image side of the main lens system LM to expand the image circle of the main lens system LM 1.58 times (Φic=43.28).

The subgroup Lp of the rear converter optical system LC in Example 5 includes one positive lens. The subgroup Ln includes a cemented lens obtained by cementing a negative lens and a positive lens and a cemented lens obtained by cementing a positive lens and a negative lens which are arranged in this order from the object side to the image side. The rear converter optical system LC having such a lens configuration is small and can expand the image circle of the main lens system LM 1.58 times while suppressing particularly the off-axis aberrations as seen in the aberration graphs in FIGS. 10A and 10B.

EXAMPLE 6

The rear converter optical system LC in Example 6 of the present invention is described below with reference to FIG. 11. The rear converter optical system LC in Example 6 includes the subgroup Lp with the positive refractive power and the subgroup Ln with the negative refractive power which are arranged, in this order from the object side to the image side, at the widest air distance from each other in the rear converter optical system LC. The effective diameter Φcr of the lens surface closest to the image side of the rear converter optical system LC is 25.03 mm and the lateral magnification βc of the rear converter optical system LC is 1.58. The backfocus skc in the case where the rear converter optical system LC is mounted on the image side of the main lens system LM is 31.24 mm, and the diameter of the image circle (effective diameter of the imaging area) Φim of the main lens system LM is 27.32 mm.

The rear converter optical system LC is mounted on the image side of the main lens system LM to expand the image circle of the main lens system LM 1.58 times (Φic=43.28).

The subgroup Lp of the rear converter optical system LC in Example 6 includes three lenses, specifically, a cemented lens obtained by cementing a positive lens, a negative lens, and a positive lens which are arranged in this order from the object side to the image side. The subgroup Ln includes a cemented lens obtained by cementing a positive lens and a negative lens. The rear converter optical system LC having such a lens configuration is small and can expand the image circle of the main lens system LM 1.58 times while suppressing particularly the off-axis aberrations as seen in the aberration graphs in FIGS. 12A and 12B.

FIG. 13 is a schematic diagram of a main portion of a single-lens reflex camera (imaging apparatus) using an imaging optical system including the attachment optical system LC of the present invention and the main lens system LM on which the attachment optical system LC is mounted. In FIG. 13, the reference numeral 10 represents an imaging optical system formed of a zoom lens having the attachment optical system of any one of Examples 1 to 6. An imaging optical system 1 is held by a lens barrel 2 which is a holding member. The reference numeral 20 is a camera main body. The camera main body 20 includes a quick return mirror 3, a focusing screen 4, a penta-dach prism 5, an eyepiece 6, and the like.

The quick return mirror 3 reflects the light beams from the imaging optical system 10 upward. The focusing screen 4 is disposed at an image forming position of the imaging optical system 10. The penta-dach prism 5 converts an inverted image formed on the focusing screen 4 into an erected image. An observer observes the erected image through the eyepiece 6.

The reference numeral 7 is a photosensitive surface and a silver halide film or an imaging element (photoelectric conversion element) such as a CCD sensor or a CMOS sensor which receives light of an image is disposed on the photosensitive surface 7. In the imaging, the quick return mirror 3 retracts from an optical path and an image is formed on the photosensitive surface 7 by the imaging optical system 10.

Moreover, the zoom lens of the present invention can be similarly applied to a mirrorless single-lens camera which has no quick return mirror. Note that the present invention can be applied to optical instruments such as a telescope, a binocular, a photocopier, and a projector, in addition to the digital camera, the video camera, the silver halide film camera, and the like.

Although the preferable embodiment of the present invention has been described above, the present invention is not limited to the disclosed embodiment and various changes and modifications can be made within the gist of the present invention.

Specific numerical value data on the rear converter optical systems of Examples 1 to 6 and numerical value data on the main lens system on which the rear converter optical systems are mounted in Examples 1 to 6 of the present invention are described below. The reference sign i represents the number of each surface in the order from the object side. The surface number i is counted in the order from the object side. The reference sign Ri represents the radius of curvature (mm), and Di represents a distance (mm) between the i-th surface and the (i+1)th surface. The reference signs Ndi and vdi represent, respectively, the refractive index and the Abbe number of a medium between the i-th surface and the (i+1)th surface at the d-line. The reference sign BF represents the backfocus. The total lens length refers to a distance from the first lens surface to the image plane.

Moreover, aspherical surfaces are shown with the reference sign * added after the surface numbers. An aspherical shape is expressed by the following expression, where X is the amount of displacement from a surface vertex in the optical axis direction, h is the height from the optical axis in the direction perpendicular to the optical axis, r is the paraxial radius of curvature, K is the conic constant, and B, C, D, E, . . . are the aspherical coefficients of the respective orders.

$$X(h) = \frac{(1/r)h^2}{1 + \sqrt{\{1 - (1+K)(h/r)^2\}}} + Bh^4 + Ch^6 + Dh^8 + Eh^{10} \ldots$$

Note that "E±XX" in the data on each aspherical coefficient means "×10^{±XX}." The numerical values relating to the aforementioned conditional expressions are shown in Table 1. An interval Lcm between the main lens system and the rear converter optical system in each Example is shown in Table 2. The numerical values corresponding respectively to the aforementioned conditional expressions in each Example are shown in Table 3.

[Numerical Value Data 1]

| [unit: mm] | | | | | |
|---|---|---|---|---|---|
| Surface number | R | D | Nd | vd | Effective diameter |
| 1 | 86.143 | 4.85 | 1.89286 | 20.4 | 23.59 |
| 2 | −29.247 | 1.20 | 1.95375 | 32.3 | 23.52 |
| 3 | 28.214 | 0.69 | | | 23.40 |
| 4 | 30.266 | 8.47 | 1.48749 | 70.2 | 24.09 |
| 5 | −23.196 | 1.49 | | | 24.78 |
| 6 | −22.113 | 1.20 | 1.85135 | 40.1 | 24.54 |
| 7* | −112.032 | 31.03 | | | 26.49 |
| Image plane | ∞ | | | | |

| Aspheric surface data | | | | |
|---|---|---|---|---|
| | Conic constant K | Coefficient of 4th order B | Coefficient of 6th order C | Coefficient of 8th order D | Coefficient of 10th order E |
| 7th surface | 0.0000E+00 | −8.6066E−06 | 3.6721E−08 | −2.6881E−10 | 6.5455E−13 |

| Various data | Wide angle end | Middle | Telephoto end |
|---|---|---|---|
| Focal length | 29.41 | 54.90 | 85.91 |
| Fno | 5.63 | 7.15 | 9.33 |
| ω (deg) | 36.34 | 21.51 | 14.13 |
| Image height | 21.64 | 21.64 | 21.64 |
| Total lens length | 141.44 | 135.49 | 143.92 |

| [unit: mm] | | | |
|---|---|---|---|
| BF | 31.03 | 31.03 | 31.03 |
| Entrance pupil position | 25.70 | 22.82 | 21.13 |
| Exit pupil position | −26.57 | −29.43 | −32.12 |
| Front principal point position | 40.09 | 27.88 | −9.83 |
| Rear principal point position | 1.62 | −23.86 | −54.88 |

| Unit data | | | | | |
|---|---|---|---|---|---|
| Unit | Start surface | Focal length | Lens structure length | Front principal point position | Rear principal point position |
| 1 | 1 | −55.52 | 20.90 | 12.98 | −1.71 |

| Single lens data | | |
|---|---|---|
| Lens | Start surface | Focal length |
| 1 | 1 | 24.950 |
| 2 | 2 | −14.910 |
| 3 | 4 | 28.410 |
| 4 | 6 | −32.560 |

[Numerical Value Data 2]

| [unit: mm] | | | | | |
|---|---|---|---|---|---|
| Surface number | R | D | Nd | vd | Effective diameter |
| 1 | 69.446 | 3.53 | 1.89286 | 20.4 | 23.82 |
| 2 | −59.366 | 1.20 | 1.88300 | 40.8 | 23.74 |
| 3 | 16.077 | 14.85 | 1.48749 | 70.2 | 23.24 |
| 4 | −24.644 | 1.41 | | | 26.64 |
| 5 | −19.844 | 1.20 | 1.85135 | 40.1 | 26.68 |
| 6* | −54.431 | 28.01 | | | 29.44 |
| Image plane | ∞ | | | | |

| Aspheric surface data | | | | |
|---|---|---|---|---|
| | Conic constant K | Coefficient of 4th order B | Coefficient of 6th order C | Coefficient of 8th order D | Coefficient of 10th order E |
| 6th surface | 0.0000E+00 | −2.1033E−05 | −1.1466E−08 | −7.4249E−12 | −2.9562E−13 |

| Various data | Wide angle end | Middle | Telephoto end |
|---|---|---|---|
| Focal length | 29.40 | 54.88 | 85.89 |
| Fno | 5.63 | 7.15 | 9.33 |
| ω (deg) | 36.35 | 21.52 | 14.14 |
| Image height | 21.64 | 21.64 | 21.64 |
| Total lens length | 143.04 | 137.09 | 145.52 |
| BF | 28.01 | 28.01 | 28.01 |
| Entrance pupil position | 25.70 | 22.82 | 21.13 |
| Exit pupil position | −29.46 | −32.30 | −34.97 |
| Front principal point position | 40.06 | 27.76 | −10.11 |
| Rear principal point position | −1.40 | −26.87 | −57.88 |

| Unit data | | | | | |
|---|---|---|---|---|---|
| Unit | Start surface | Focal length | Lens structure length | Front principal point position | Rear principal point position |
| 1 | 1 | −55.34 | 25.20 | 12.73 | −4.61 |

| Single lens data | | |
|---|---|---|
| Lens | Start surface | Focal length |
| 1 | 1 | 36.320 |
| 2 | 2 | −14.220 |
| 3 | 3 | 22.670 |
| 4 | 5 | −37.280 |

[Numerical Value Data 3]

[unit: mm]

| Surface number | R | D | Nd | vd | Effective diameter |
|---|---|---|---|---|---|
| 1 | 75.889 | 3.88 | 1.89286 | 20.4 | 23.76 |
| 2 | −45.454 | 1.20 | 1.90043 | 37.4 | 23.70 |
| 3 | 23.206 | 1.49 | | | 23.41 |
| 4 | 30.940 | 14.23 | 1.48749 | 70.2 | 24.74 |
| 5 | −15.686 | 1.20 | 1.85135 | 40.1 | 26.58 |
| 6* | −46.487 | 30.74 | | | 30.63 |
| Image plane | ∞ | | | | |

Aspheric surface data

| | Conic constant K | Coefficient of 4th order B | Coefficient of 6th order C | Coefficient of 8th order D | Coefficient of 10th order E |
|---|---|---|---|---|---|
| 6th surface | 0.0000E+00 | −1.7467E−05 | 5.7858E−09 | −1.0341E−10 | 9.5883E−14 |

| Various data | Wide angle end | Middle | Telephoto end |
|---|---|---|---|
| Focal length | 29.42 | 54.92 | 85.95 |
| Fno | 5.63 | 7.16 | 9.34 |
| ω (deg) | 36.33 | 21.50 | 14.13 |
| Image height | 21.64 | 21.64 | 21.64 |
| Total lens length | 145.25 | 139.30 | 147.74 |
| BF | 30.74 | 30.74 | 30.74 |
| Entrance pupil position | 25.70 | 22.82 | 21.13 |
| Exit pupil position | −33.76 | −37.37 | −40.79 |
| Front principal point position | 41.70 | 33.45 | 3.80 |
| Rear principal point position | 1.32 | −24.18 | −55.21 |

Unit data

| Unit | Start surface | Focal length | Lens structure length | Front principal point position | Rear principal point position |
|---|---|---|---|---|---|
| 1 | 1 | −66.33 | 25.00 | 8.94 | −8.43 |

Single lens data

| Lens | Start surface | Focal length |
|---|---|---|
| 1 | 1 | 32.330 |
| 2 | 2 | −16.920 |
| 3 | 4 | 23.730 |
| 4 | 5 | −28.320 |

[Numerical Value Data 4]

[unit: mm]

| Surface number | R | D | Nd | vd | Effective diameter |
|---|---|---|---|---|---|
| 1 | 128.556 | 1.20 | 1.88300 | 40.8 | 23.54 |
| 2 | 16.150 | 6.15 | 1.68893 | 31.1 | 23.51 |
| 3 | 54.503 | 0.14 | | | 24.14 |
| 4 | 43.733 | 5.61 | 1.58144 | 40.8 | 24.60 |
| 5 | −37.800 | 2.70 | | | 25.03 |
| 6* | −30.145 | 1.20 | 1.85135 | 40.1 | 25.02 |
| 7 | 557.068 | 31.50 | | | 26.20 |
| Image plane | ∞ | | | | |

Aspheric surface data

| | Conic constant K | Coefficient of 4th order B | Coefficient of 6th order C | Coefficient of 8th order D | Coefficient of 10th order E |
|---|---|---|---|---|---|
| 6th surface | 0.0000E+00 | 1.0857E−05 | −2.9564E−08 | 3.3050E−10 | −6.4560E−13 |

| Various data | Wide angle end | Middle | Telephoto end |
|---|---|---|---|
| Focal length | 29.41 | 54.90 | 85.92 |
| Fno | 5.63 | 7.15 | 9.33 |

-continued

| [unit: mm] | | | |
|---|---|---|---|
| ω (deg) | 36.34 | 21.51 | 14.13 |
| Image height | 21.64 | 21.64 | 21.64 |
| Total lens length | 140.99 | 135.04 | 143.48 |
| BF | 31.50 | 31.50 | 31.50 |
| Entrance pupil position | 25.70 | 22.82 | 21.13 |
| Exit pupil position | −25.43 | −28.22 | −30.84 |
| Front principal point position | 39.91 | 27.25 | −11.38 |
| Rear principal point position | 2.08 | −23.40 | −54.42 |

Unit data

| Unit | Start surface | Focal length | Lens structure length | Front principal point position | Rear principal point position |
|---|---|---|---|---|---|
| 1 | 1 | −54.51 | 19.99 | 13.35 | −0.66 |

Single lens data

| Lens | Start surface | Focal length |
|---|---|---|
| 1 | 1 | −21.020 |
| 2 | 2 | 31.270 |
| 3 | 4 | 35.780 |
| 4 | 6 | −33.560 |

[Numerical Value Data 5]

| [unit: mm] | | | | | |
|---|---|---|---|---|---|
| Surface number | R | D | Nd | νd | Effective diameter |
| 1 | 521.225 | 3.45 | 1.89286 | 20.4 | 24.65 |
| 2 | −38.199 | 0.88 | | | 24.73 |
| 3 | −33.333 | 1.20 | 1.88300 | 40.8 | 24.40 |
| 4 | 22.427 | 6.83 | 1.51742 | 52.4 | 25.23 |
| 5 | −137.636 | 0.50 | | | 26.44 |
| 6 | −136.354 | 7.39 | 1.49700 | 81.5 | 26.78 |
| 7 | −19.188 | 1.20 | 1.85135 | 40.1 | 27.87 |
| 8* | −60.077 | 19.89 | | | 31.29 |
| Image plane | ∞ | | | | |

Aspheric surface data

| | Conic constant K | Coefficient of 4th order B | Coefficient of 6th order C | Coefficient of 8th order D | Coefficient of 10th order E |
|---|---|---|---|---|---|
| 7th surface | 0.0000E+00 | −1.4393E−05 | 3.2746E−08 | −1.5959E−10 | 2.0959E−13 |

| Various data | Wide angle end | Middle | Telephoto end |
|---|---|---|---|
| Focal length | 29.31 | 54.70 | 85.61 |
| Fno | 5.61 | 7.13 | 9.30 |
| ω (deg) | 36.43 | 21.58 | 14.18 |
| Image height | 21.64 | 21.64 | 21.64 |
| Total lens length | 140.80 | 134.84 | 143.28 |
| BF | 19.89 | 19.89 | 19.89 |
| Entrance pupil position | 25.70 | 22.82 | 21.13 |
| Exit pupil position | −31.58 | −33.87 | −36.00 |
| Front principal point position | 38.32 | 21.86 | −24.41 |
| Rear principal point position | −9.42 | −34.81 | −65.72 |

[unit: mm]

Unit data

| Unit | Start surface | Focal length | Lens structure length | Front principal point position | Rear principal point position |
|---|---|---|---|---|---|
| 1 | 1 | −47.26 | 31.41 | 16.16 | −7.72 |

Single lens data

| Lens | Start surface | Focal length |
|---|---|---|
| 1 | 1 | 39.980 |
| 2 | 3 | −15.030 |
| 3 | 4 | 37.820 |
| 4 | 6 | 44.010 |
| 5 | 7 | −33.570 |

[Numerical Value Data 6]

[unit: mm]

| Surface number | R | D | Nd | vd | Effective diameter |
|---|---|---|---|---|---|
| 1 | 124.555 | 4.17 | 1.89286 | 20.4 | 23.49 |
| 2 | −32.702 | 1.20 | 1.91082 | 35.3 | 23.46 |
| 3 | 41.730 | 6.15 | 1.51742 | 52.4 | 23.42 |
| 4 | −27.983 | 0.84 | | | 23.69 |
| 5 | −38.553 | 3.73 | 1.72825 | 28.5 | 23.23 |
| 6 | −18.775 | 1.20 | 2.00100 | 29.1 | 23.39 |
| 7 | 489.688 | 31.24 | | | 25.03 |
| Image plane | ∞ | | | | |

| Various data | Wide angle end | Middle | Telephoto end |
|---|---|---|---|
| Focal length | 29.40 | 54.88 | 85.89 |
| Fno | 5.63 | 7.15 | 9.33 |
| ω (deg) | 36.34 | 21.51 | 14.14 |
| Image height | 21.64 | 21.64 | 21.64 |
| Total lens length | 141.04 | 135.09 | 143.52 |
| BF | 31.24 | 31.24 | 31.24 |
| Entrance pupil position | 25.70 | 22.82 | 21.13 |
| Exit pupil position | −24.22 | −26.86 | −29.34 |
| Front principal point position | 39.51 | 25.86 | −14.77 |
| Rear principal point position | 1.83 | −23.65 | −54.66 |

Unit data

| Unit | Start surface | Focal length | Lens structure length | Front principal point position | Rear principal point position |
|---|---|---|---|---|---|
| 1 | 1 | −52.43 | 20.29 | 14.13 | 0.33 |

Single lens data

| Lens | Start surface | Focal length |
|---|---|---|
| 1 | 1 | 29.380 |
| 2 | 2 | −19.980 |
| 3 | 3 | 33.380 |
| 4 | 5 | 46.550 |
| 5 | 6 | −18.040 |

[Main Lens System]

[unit: mm]

| Surface number | R | D | Nd | vd | Effective diameter |
|---|---|---|---|---|---|
| 1 | 76.201 | 4.00 | 1.51633 | 64.1 | 39.74 |
| 2 | ∞ | 0.20 | | | 38.15 |
| 3 | 87.093 | 1.60 | 1.62041 | 60.3 | 33.81 |

-continued

[unit: mm]

| | | | | | |
|---|---|---|---|---|---|
| 4 | 17.794 | 6.69 | | | 26.22 |
| 5 | −275.114 | 1.20 | 1.69680 | 55.5 | 25.64 |
| 6 | 17.652 | 0.85 | | | 22.97 |
| 7 | 18.819 | 3.98 | 1.84666 | 23.9 | 23.20 |
| 8 | 40.701 (variable) | | | | 22.44 |
| 9 | 514.990 | 1.75 | 1.48749 | 70.2 | 12.37 |
| 10 | −39.993 (variable) | | 0.00000 | 0.0 | 12.53 |
| 11 | −23.240 | 0.80 | 1.62041 | 60.3 | 13.07 |
| 12 | −188.681 (variable) | | | | 13.64 |
| 13 | 38.777 | 3.25 | 1.69680 | 55.5 | 14.73 |
| 14 | −29.086 | 0.20 | | | 14.95 |
| 15 | 35.964 | 4.28 | 1.48749 | 70.2 | 14.68 |
| 16 | −18.478 | 1.00 | 1.84666 | 23.9 | 14.21 |
| 17 | −50.317 | 1.00 | | | 14.18 |
| 18 (stop) | ∞ (variable) | | | | 13.77 |
| 19 | −33.107 | 2.40 | 1.84666 | 23.9 | 10.98 |
| 20 | −11.931 | 1.20 | 1.80100 | 35.0 | 10.96 |
| 21 | 59.634 (variable) | | | | 11.01 |
| 22 | 180.914 | 1.70 | 1.52996 | 55.8 | 16.99 |
| 23* | −255.105 | 0.20 | | | 17.58 |
| 24 | ∞ | 3.54 | 1.48749 | 70.2 | 17.72 |
| 25 | −22.981 (variable) | | | | 18.43 |
| Image plane | ∞ | | | | |

Aspheric surface data

| | Conic constant K | Coefficient of 4th order B | Coefficient of 6th order C | Coefficient of 8th order D | Coefficient of 10th order E |
|---|---|---|---|---|---|
| 23th surface | 0.0000E+00 | 2.3632E−05 | 7.1007E−08 | −1.0968E−09 | 6.2709E−12 |

Various data

| | Wide angle end | Middle | Telephoto end |
|---|---|---|---|
| Focal length | 18.50 | 34.53 | 54.04 |
| Fno | 3.54 | 4.50 | 5.87 |
| ω (deg) | 36.44 | 21.58 | 14.19 |
| Image height | 13.66 | 13.66 | 13.66 |
| Total lens length | 123.09 | 117.13 | 125.57 |
| BF | 35.57 | 49.45 | 65.39 |
| Entrance pupil position | 25.70 | 22.82 | 21.13 |
| Exit pupil position | −30.06 | −26.51 | −22.43 |
| Front principal point position | 38.98 | 41.65 | 41.92 |
| Rear principal point position | 7.07 | 14.92 | 11.35 |

Variable interval

| Surface number | Wide angle end | Middle | Telephoto end |
|---|---|---|---|
| 8 | 29.35 | 9.51 | 2.00 |
| 10 | 3.87 | 4.73 | 4.96 |
| 12 | 2.29 | 1.43 | 1.20 |
| 18 | 3.42 | 7.23 | 10.77 |
| 21 | 8.75 | 4.94 | 1.41 |
| 25 | 35.57 | 49.45 | 65.39 |

Unit data

| Unit | Start surface | Focal length | Lens structure length | Front principal point position | Rear principal point position |
|---|---|---|---|---|---|
| 1 | 1 | −25.59 | 18.52 | 8.63 | −5.22 |
| 2 | 9 | 76.21 | 1.75 | 1.09 | −0.08 |
| 3 | 11 | −42.80 | 0.80 | −0.07 | −0.56 |
| 4 | 13 | 19.37 | 9.73 | 1.38 | −5.24 |
| 5 | 19 | −28.02 | 3.60 | 0.60 | −1.33 |
| 6 | 22 | 38.65 | 5.44 | 3.11 | −0.62 |

-continued

[unit: mm]

Single lens data

| Lens | Start surface | Focal length |
|------|---------------|--------------|
| 1    | 1             | 147.580      |
| 2    | 3             | −36.370      |
| 3    | 5             | −23.770      |
| 4    | 7             | 38.160       |
| 5    | 9             | 76.210       |
| 6    | 11            | −42.800      |
| 7    | 13            | 24.330       |
| 8    | 15            | 25.700       |
| 9    | 16            | −34.990      |
| 10   | 19            | 20.940       |
| 11   | 20            | −12.320      |
| 12   | 22            | 200.000      |
| 13   | 24            | 47.140       |

TABLE 1

|        | Example 1 | Example 2 | Example 3 | Example 4 | Example 5 | Example 6 |
|--------|-----------|-----------|-----------|-----------|-----------|-----------|
| Φim    | 27.32     | 27.32     | 27.32     | 27.32     | 27.32     | 27.32     |
| Φic    | 43.28     | 43.28     | 43.28     | 43.28     | 43.28     | 43.28     |
| Φcr    | 26.49     | 29.44     | 30.63     | 26.20     | 31.29     | 25.03     |
| Φcf    | 23.59     | 23.82     | 23.76     | 23.54     | 24.65     | 23.49     |
| skc    | 31.03     | 28.01     | 30.74     | 31.50     | 19.89     | 31.24     |
| βc     | 1.58      | 1.58      | 1.58      | 1.58      | 1.58      | 1.58      |
| Ymax   | 21.64     | 21.64     | 21.64     | 21.64     | 21.64     | 21.64     |
| fp     | 75.78     | 95.38     | 85.79     | 87.11     | 39.98     | 63.67     |
| fn     | −32.56    | −37.28    | −38.49    | −33.56    | −20.60    | −27.64    |

TABLE 2

|     | Example 1 | Example 2 | Example 3 | Example 4 | Example 5 | Example 6 |
|-----|-----------|-----------|-----------|-----------|-----------|-----------|
| Lcm | 3.00      | 3.00      | 3.00      | 3.00      | 9.96      | 3.00      |

TABLE 3

|     | Example 1 | Example 2 | Example 3 | Example 4 | Example 5 | Example 6 |
|-----|-----------|-----------|-----------|-----------|-----------|-----------|
| (1) | 0.61      | 0.68      | 0.70      | 0.60      | 0.72      | 0.58      |
| (2) | 1.11      | 1.13      | 1.20      | 1.11      | 1.04      | 1.08      |
| (3) | 1.22      | 1.36      | 1.42      | 1.21      | 1.45      | 1.16      |
| (4) | 1.11      | 1.13      | 1.21      | 1.12      | 1.04      | 1.08      |
| (5) | 1.12      | 1.24      | 1.29      | 1.11      | 1.27      | 1.07      |
| (6) | 1.58      | 1.58      | 1.58      | 1.58      | 1.58      | 1.58      |
| (7) | 1.58      | 1.58      | 1.58      | 1.58      | 1.58      | 1.58      |
| (8) | 1.43      | 1.29      | 1.42      | 1.46      | 0.92      | 1.44      |
| (9) | 2.33      | 2.56      | 2.23      | 2.60      | 1.94      | 2.30      |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-157492, filed Aug. 10, 2016, which is hereby incorporated by reference herein in its entirety.

What is claimed is:

1. A rear converter optical system which is detachably mounted on an image side of a main lens system to increase a focal length of the main lens system, wherein following conditional expressions are satisfied:

$$0.58 \leq \Phi cr/(\Phi im \times \beta c) < 1.0; \text{ and}$$

$$0.8 < (\Phi cr/2 + 0.35 \times skc)/(\Phi im \times \beta c/2) < 1.5,$$

where $\Phi im$ represents a diameter of an image circle of the main lens system, $\Phi cr$ represents an effective diameter, which is a diameter of a region through which light rays imaged by the main lens system and the rear converter optical system pass, of a lens surface closest to the image side of the rear converter optical system, $\beta c$ represents a lateral magnification of the rear converter optical system in the case where the rear converter optical system is mounted on the main lens system, and skc represents a backfocus in the case where the rear converter optical system is mounted on the main lens system.

2. The rear converter optical system according to claim 1, comprising a positive lens and a negative lens.

3. The rear converter optical system according to claim 1, comprising two positive lenses and two negative lenses.

4. The rear converter optical system according to claim 1, wherein a following conditional expression is satisfied:

$$1.0 < \Phi cr/\Phi cf < 1.5,$$

where $\Phi cf$ represents an effective diameter, which is a diameter of a region through which light rays imaged by the main lens system and the rear converter optical system pass, of a lens surface closest to an object side of the rear converter optical system.

5. The rear converter optical system according to claim 1, wherein a following conditional expression is satisfied:

$$1.4 < \beta c < 2.0,$$

where $\beta c$ represents the lateral magnification of the rear converter optical system in the case where the rear converter optical system is mounted on the main lens system.

6. The rear converter optical system according to claim 1, wherein a following conditional expression is satisfied:

$$1.4 < \Phi ic/\Phi im < 2.0,$$

where $\Phi ic$ represents a diameter of an image circle in the case where the rear converter optical system is mounted on the main lens system.

7. The rear converter optical system according to claim 1, wherein a following conditional expression is satisfied:

$$0.7 < skc/(\Phi ic/2) < 1.8,$$

where Φic represents a diameter of an image circle in the case where the rear converter optical system is mounted on the main lens system.

8. The rear converter optical system according to claim 1, comprising a subgroup Lp with a positive refractive power and a subgroup Ln with a negative refractive power which are arranged, in this order from an object side to the image side, at the widest air distance from each other in the rear converter optical system.

9. The rear converter optical system according to claim 8, wherein a following conditional expression is satisfied:

$$1.0 < |fp/fn| < 5.0,$$

where fp represents a focal length of the subgroup Lp and fn represents the focal length of the subgroup Ln.

10. The rear converter optical system according to claim 1, comprising a subgroup Ln with a negative refractive power and a subgroup Lp with a positive refractive power which are arranged, in this order from an object side to the image side, at the widest air distance from each other in the rear converter optical system.

11. An imaging apparatus comprising:
a main lens system;
the rear converter optical system according to claim 1; and
a photoelectric conversion element which receives light of an image formed by the main lens system.

12. A rear converter optical system which is detachably mounted on an image side of a main lens system to expand an imaging area of the main lens system,
wherein following conditional expressions are satisfied:

$$0.8 < \Phi cr/Y\max < 2.0; \text{ and}$$

$$0.9 < (\Phi cr/2 + 0.35 \times skc)/Y\max < 1.3,$$

where 2Ymax represents a diameter of an image circle in the case where the rear converter optical system is mounted on the main lens system, Φcr represents an effective diameter, which is a diameter of a region through which light rays imaged by the main lens system and the rear converter optical system pass, of a lens surface closest to the image side of the rear converter optical system, and skc represents a backfocus in the case where the rear converter optical system is mounted on the main lens system.

13. A rear converter optical system which is detachably mounted on an image side of a main lens system to increase a focal length of the main lens system, wherein following conditional expressions are satisfied:

$$0.4 < \Phi cr/(\Phi im \times \beta c) < 1.0;$$

$$0.8 < (\Phi cr/2 + 0.35 \times skc)/(\Phi im \times \beta c/2) < 1.5; \text{ and}$$

$$1.4 < \Phi ic/\Phi im < 2.0,$$

where Φim represents an effective diameter of an imaging area of the main lens system, Φcr represents an effective diameter of a lens surface closest to the image side of the rear converter optical system, βc represents a lateral magnification of the rear converter optical system in the case where the rear converter optical system is mounted on the main lens system, skc represents a backfocus in the case where the rear converter optical system is mounted on the main lens system, and Φic represents an effective diameter of an imaging area in the case where the rear converter optical system is mounted on the main lens system.

14. A rear converter optical system which is detachably mounted on an image side of a main lens system to expand an imaging area of the main lens system, wherein following conditional expressions are satisfied:

$$0.8 < \Phi cr/Y\max < 2.0;$$

$$0.8 < (\Phi cr/2 + 0.35 \times skc)/Y\max < 1.5; \text{ and}$$

$$1.4 < \Phi ic/\Phi im < 2.0,$$

where 2Ymax represents an effective diameter of an imaging area in the case where the rear converter optical system is mounted on the main lens system, Φcr represents an effective diameter of a lens surface closest to the image side of the rear converter optical system, skc represents a backfocus in the case where the rear converter optical system is mounted on the main lens system, Φim represents the effective diameter of the imaging area of the main lens system and Φic represents an effective diameter of an imaging area in the case where the rear converter optical system is mounted on the main lens system.

* * * * *